(12) United States Patent
Baeuml et al.

(10) Patent No.: US 12,400,634 B2
(45) Date of Patent: Aug. 26, 2025

(54) DYNAMICALLY ADAPTING GIVEN ASSISTANT OUTPUT BASED ON A GIVEN PERSONA ASSIGNED TO AN AUTOMATED ASSISTANT

(71) Applicant: GOOGLE LLC, Mountain View, CA (US)

(72) Inventors: Martin Baeuml, Zurich (CH); Thushan Amarasiriwardena, Alameda, CA (US); Roberto Pieraccini, Zurich (CH); Gianluca Martini, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 342 days.

(21) Appl. No.: 17/726,244

(22) Filed: Apr. 21, 2022

(65) Prior Publication Data

US 2023/0343323 A1 Oct. 26, 2023

(51) Int. Cl.
*G06F 16/3329* (2025.01)
*G06F 40/169* (2020.01)
(Continued)

(52) U.S. Cl.
CPC ............ *G10L 13/10* (2013.01); *G06F 40/169* (2020.01); *G06T 7/20* (2013.01); *G06V 20/40* (2022.01);
(Continued)

(58) Field of Classification Search
CPC ......... G10L 13/10; G10L 13/02; G10L 13/08; G10L 15/063; G10L 15/1815;
(Continued)

(56) References Cited

U.S. PATENT DOCUMENTS 11,605,387 B1 * 3/2023 Muralitharan .......... G10L 15/22
2015/0172262 A1 6/2015 Ortiz et al.
(Continued)

OTHER PUBLICATIONS

Mufin: Enriching Semantic Understanding of Sentence Embedding using Dual Tune Framework (Year: 2021).*
(Continued)

*Primary Examiner* — Pierre Louis Desir
*Assistant Examiner* — Kristen Michelle Masters
(74) *Attorney, Agent, or Firm* — Gray Ice Higdon

(57) ABSTRACT

Implementations relate to dynamically adapting a given assistant output based on a given persona, from among a plurality of disparate personas, assigned to an automated assistant. In some implementations, the given assistant output can be generated and subsequently adapted based on the given persona assigned to the automated assistant. In other implementations, the given assistant output can be generated specific to the given persona and without having to subsequently adapt the given assistant output to the given persona. Notably, the given assistant output can include a stream of textual content to be synthesized for audible presentation to the user, and a stream of visual cues utilized in controlling a display of a client device and/or in controlling a visualized representation of the automated assistant. Various implementations utilize large language models (LLMs), or output previously generated utilizing LLMs, to reflect the given persona in the given assistant output.

18 Claims, 10 Drawing Sheets

(51) Int. Cl.
  *G06F 40/56*   (2020.01)
  *G06T 7/20*    (2017.01)
  *G06V 20/40*   (2022.01)
  *G06V 40/20*   (2022.01)
  *G10L 13/02*   (2013.01)
  *G10L 13/033*  (2013.01)
  *G10L 13/08*   (2013.01)
  *G10L 13/10*   (2013.01)
  *G10L 15/06*   (2013.01)
  *G10L 15/18*   (2013.01)
  *G10L 15/183*  (2013.01)
  *G10L 15/22*   (2006.01)
  *G10L 25/57*   (2013.01)
  *H04N 5/04*    (2006.01)

(52) U.S. Cl.
  CPC ............ *G06V 40/20* (2022.01); *G10L 13/02* (2013.01); *G10L 13/08* (2013.01); *G10L 15/063* (2013.01); *G10L 15/1815* (2013.01); *G10L 15/183* (2013.01); *G10L 15/22* (2013.01); *G10L 25/57* (2013.01); *H04N 5/04* (2013.01); *G06T 2207/10016* (2013.01); *G06T 2207/30196* (2013.01); *G10L 2015/223* (2013.01)

(58) Field of Classification Search
  CPC ....... G10L 15/183; G10L 15/22; G10L 25/57; G10L 2015/223; G10L 13/033; G10L 2015/228; G06F 40/169; G06F 16/3329; G06F 40/56; G06F 3/167; G06F 3/16; G06T 7/20; G06T 2207/10016; G06T 2207/30196; G06V 20/40; G06V 40/20; H04N 5/04
  See application file for complete search history.

(56) References Cited

U.S. PATENT DOCUMENTS

| | | | |
|---|---|---|---|
| 2019/0341050 A1* | 11/2019 | Diamant | G06V 40/172 |
| 2020/0137230 A1 | 4/2020 | Spohrer | |
| 2020/0302927 A1 | 9/2020 | Andruszkiewicz | |
| 2020/0387677 A1* | 12/2020 | Kim | G06F 40/35 |
| 2021/0104236 A1 | 4/2021 | Doggett | |
| 2021/0124422 A1* | 4/2021 | Forsland | G06N 20/00 |
| 2023/0127090 A1* | 4/2023 | Eirinberg | G06V 40/171 |
| | | | 345/473 |
| 2023/0259540 A1 | 8/2023 | Das | |
| 2023/0260326 A1 | 8/2023 | Zhou | |

OTHER PUBLICATIONS

European Patent Office; International Search Report and Written Opinion issued in Application No. PCT/US2022/047027; 24 pages; dated Mar. 21, 2023.

Boseop, K. et al., "What Changes Can Large-scale Language Models Bring?" Intensive Study on HyperCLOVA: Billions-scale Korean Generative Pretrained Transformers; arXiv.org, Cornell University Library; arXiv:2109.04650v2; 20 pages; dated Nov. 28, 2021.

European Patent Office; Invitation to Pay Additional Fees issued in Application No. PCT/US2022/047027; 18 pages; dated Jan. 25, 2023.

European Patent Office, Intention to Grant issued in Application No. 22803121.7; 99 pages; dated May 7, 2025.

* cited by examiner

RECEIVE, FROM A DEVELOPER ASSOCIATED WITH THE AUTOMATED ASSISTANT AND FOR THE GIVEN PERSONA, DEVELOPER INPUT THAT ANNOTATES THE STREAM OF TEXTUAL CONTENT WITH VISUAL CUE TIMESTAMP(S) THAT INDICATE WHEN A STREAM OF VISUAL CUES IS TO BE UTILIZED WITH RESPECT TO A STREAM OF TEXTUAL CONTENT 552

↓

GENERATE, BASED ON AT LEAST THE DEVELOPER INPUT, THE GIVEN PERSONA TRAINING INSTANCE 554

500B

RECEIVE, FROM A DEVELOPER ASSOCIATED WITH THE AUTOMATED ASSISTANT AND FOR THE GIVEN PERSONA, DEVELOPER INPUT THAT MODIFIES A SCREEN ANIMATION AS A STREAM OF VISUAL CUES WITH RESPECT TO A STREAM OF TEXTUAL CONTENT 556

↓

GENERATE, BASED ON AT LEAST THE DEVELOPER INPUT, THE GIVEN PERSONA TRAINING INSTANCE 558

500C

OBTAIN, FROM AN ONLINE MULTIMEDIA REPOSITORY, VIDEO CONTENT THAT INCLUDES A STREAM OF AUDIO DATA FOR AUDIBLE CONTENT OF THE VIDEO AND A STREAM OF VISION DATA FOR VISUAL CONTENT OF THE VIDEO 560

↓

PROCESS THE STREAM OF AUDIO DATA TO GENERATE A STREAM OF TEXTUAL CONTENT AND THE STREAM OF VISION DATA TO GENERATE A STREAM OF VISUAL CUES 562

↓

GENERATE, BASED ON AT LEAST THE STREAM OF TEXTUAL CONTENT AND THE STREAM OF VISUAL CUES, THE GIVEN PERSONA TRAINING INSTANCE 564

DYNAMICALLY ADAPTING GIVEN ASSISTANT OUTPUT BASED ON A GIVEN PERSONA ASSIGNED TO AN AUTOMATED ASSISTANT

BACKGROUND

Humans may engage in human-to-computer dialogs with interactive software applications referred to herein as "automated assistants" (also referred to as "chatbots," "interactive personal assistants," "intelligent personal assistants," "personal voice assistants," "conversational agents," etc.). Automated assistants typically rely upon a pipeline of components in interpreting and responding to spoken utterances. For example, an automatic speech recognition (ASR) engine can process audio data that corresponds to a spoken utterance of a user to generate ASR output, such as ASR hypotheses (i.e., sequence of term(s) and/or other token(s)) of the spoken utterance. Further, a natural language understanding (NLU) engine can process the ASR output (or touch/typed input) to generate NLU output, such as a request (e.g., intent) expressed by the user in providing the spoken utterance (or the touch/typed input) and optionally slot value(s) for parameter(s) associated with the intent. Eventually, the NLU output can be processed by various fulfillment components to generate fulfillment output, such as responsive content that is responsive to the spoken utterance and/or one or more actions that can be performed responsive to the spoken utterance.

Generally, these automated assistants respond to the spoken utterance using the aforementioned pipeline of components. For example, these automated assistants can cause audible content to be provided for audible presentation to the user using various text-to-speech (TTS) techniques, such as a response to a query, a confirmation that one or more actions were performed on behalf of the user, etc. Further, these automated assistants can additionally, or alternatively, cause visual content to be provided for visual presentation to the user, such as displaying an information card that includes information requested by the user, various interfaces for various applications accessible at client devices at which these automated assistants are being implemented, etc. While improvements have been made with respect to the audible content provided for presentation to users by these automated assistants during these dialog sessions (e.g., to more accurately mirror natural conversations between humans), improvements to the visual content provided for visual presentation by these automated assistants during these dialog sessions have remained relatively static.

For example, assume a given user directs a spoken utterance of "Good morning" to a given automated assistant implemented at a given client device of the given user. In this example, further assume that this spoken utterance causes the given automated assistant to greet the given user, provide an overview of a weather forecast to the given user, and provide news headlines to the given user, such as through audible presentation of synthesized speech of "Good morning John, the weather today is 65 and sunny, here is your news [NEWS]". Notably, the given automated assistant can cause a display of the given client device to display textual content corresponding to the system speech, an information card associated with the weather forecast, an information card associated with the new headlines, and so on. However, in this example, the visual content provided for presentation to the given user by the given automated assistant is simply confirming information being provided in the audible content. Accordingly, the visual content that is provided for presentation to the given user lacks the visual richness that humans may express when communicating, such as facial expressions, body language, animation, and so on.

One solution to this lack of visual richness that humans express may include providing a visualized representation (e.g., an avatar) for these automated assistants. However, current visualized representations of these automated assistants are relatively limited in terms of the visual richness of information that they can convey to users. Continuing with the above example, a given visualized representation of the given automated assistant may persist on the display of the given client device, and may employ a hard-coded rule of "CONTEXT[GREETING]=ACTION[WAVE]" to cause the given visualized representation of the given automated assistant to wave at the given user when saying "Good morning". However, the range of visual richness that humans may express when communicating may be virtually limitless. As a result, there is a need in the art for techniques aimed at improving the visual content provided for presentation to users by these automated assistants during these dialog sessions.

SUMMARY

Implementations described herein are directed to enabling an automated assistant to dynamically adapt given assistant outputs based on a given persona, from among a plurality of disparate personas, assigned to the automated assistant. The given assistant outputs can include, for example, corresponding streams of textual content and corresponding streams of visual cues. The corresponding streams of textual content can include textual content that is responsive to a corresponding spoken utterance and that is to be synthesized for audible presentation to a user that provided the corresponding spoken utterance. Further, the corresponding streams of visual cues can include instructions for controlling a display of a client device (e.g., at which an instance of the automated assistant is implemented) responsive to the corresponding spoken utterance and/or for controlling a visualized representation of the instance of the automated assistant. For instance, the corresponding stream of visual cues can include display animations that cause the display of the client device to be dynamically adapted, animated physical motion gestures that are performed by the visualized representation of the automated assistant, and/or any other instructions to otherwise control the display and/or the visualized representation of the instance of the automated assistant. The given persona can be embodied by, for example, a given vocabulary that is specific to the given persona and that is utilized in generating the corresponding streams of textual content, a given set of prosodic properties that is specific to the given persona and that is utilized in synthesizing the corresponding streams of textual content for audible presentation to the user, and/or a given set of visual cues that includes some visual cues that are specific to the given persona (e.g., animated physical motion gestures that are commonly associated with the visualized representation of the instance of the automated assistant) and that includes some visual cues that are common amongst multiple personas of the plurality of disparate personas (e.g., waving, certain facial expressions, etc.). The visualized representation of the automated assistant can be, for example, an animated avatar or entity that represents the instance of the automated assistant, and can be based on, for example, a real human, a fictional character, animated object(s) and/or animal(s), and/or other visualized representations.

Implementations can receive a stream of audio data that captures a spoken utterance of a user, and generate a given assistant output that is responsive to the spoken utterance based on processing the stream of audio data. The given assistant output can include a stream of textual content and a stream of visual cues for controlling the display of the client device responsive to the spoken utterance and/or for controlling the visualized representation of the instance of the automated assistant that is visually rendered for presentation to the user via the display of the client device. Implementations can cause synthesized speech audio data capturing synthesized speech corresponding to the stream of textual content to be audibly rendered for presentation to the user via speaker(s) of the client device, and can cause the stream of visual cues to be utilized in controlling the display of the client device and/or in controlling the visualized representation of the instance of the automated assistant. Notably, the given assistant output that is responsive to the spoken utterance may be specific to the given persona that the user assigned to the instance of the client device.

In some versions of those implementations, implementations can process, using an automatic speech recognition (ASR) model, the stream of audio data that captures the spoken utterance to generate a stream of ASR output. Further, implementations can process, using a natural language understanding (NLU) model, the stream of ASR output to generate a stream of NLU output. Moreover, implementations can determine, based on at least the stream of NLU output, the given assistant output that is responsive to the spoken utterance. Notably, the given assistant output in these implementations is generated using a typical automated assistant pipeline and may not include the stream of visual cues or may only include a very rudimentary stream of visual cues, such as a static graphic or information card to be provided for visual presentation to the user. Accordingly, implementations can modify the given assistant output to generate a modified given assistant output that tailors the given assistant output to the given persona that is assigned to the automated assistant. For instance, implementations can process the given assistant output using a large language model (LLM) (e.g., one or more transformer models, such as Meena, RNNs, and/or any other LLM) that is specific to the given persona and/or that utilized given persona data that is specific to the given persona to generate the modified given assistant output. Also, for instance, implementations can determine previously generated LLM output that was previously generated based on the same or similar spoken utterance that was provided by the user to generate the modified given assistant output.

As used herein, the previously generated LLM output that is utilized in an offline manner (e.g., generated prior to receiving the spoken utterance) and/or LLM output that is generated in an online manner (e.g., generated in response to receiving the spoken utterance) may include one or more probability distributions. For instance, in determining the stream of textual content as described herein, these LLM outputs may include a corresponding probability distribution over a sequence of one or more words and/or phrases across one or more vocabularies. The stream of textual content can be selected from the one or more words and/or phrases based on probabilities included in the probability distribution. In some implementations, the one or more vocabularies may include a vocabulary that is specific to the given persona assigned to the automated assistant. In additional or alternative implementations, the one or more vocabularies may include a general vocabulary, but selection of the textual content for inclusion in the stream of textual content may be biased towards one or more words and/or phrases that are specific to the given persona.

Also, for instance, in determining the stream of visual cues as described herein, these LLM outputs may include a corresponding probability distribution over a sequence of tokens representing one or more animated physical motion gestures that are performable by the visualized representation of the instance of the automated assistant and/or one or more display animations that may be implemented by the display of the client device. The stream of visual cues can be selected from the one or more animated physical motion gestures and/or the one or more display animations based on probabilities included in the probability distribution and for the sequence of tokens. In some implementations, the one or more animated physical motion gestures and/or the one or more display animations may include animated physical motion gestures that are specific to the given persona assigned to the automated assistant. In additional or alternative implementations, the one or more animated physical motion gestures may include general animated physical motion gestures, but selection of the animated physical motion gestures for inclusion in the stream of textual cues may be biased towards one or more animated physical motion gestures that are specific to the given persona.

In additional or alternative versions of those implementations, implementations can process, using an LLM, the stream of audio data that captures the spoken utterance, the stream of ASR output for the spoken utterance, the stream of NLU output for the spoken utterance, and/or a context of a dialog session in which the spoken utterance was received (if any) to generate the given assistant output. In these implementations, implementations may not subsequently modify the given assistant output since it may be generated specific to the given persona through utilization of the LLM. For instance, an instance of the LLM may have been previously trained to generate given assistant outputs for a given persona, such that each of the plurality of disparate personas may be associated with a corresponding instance of the LLM. Also, for instance, the LLM may be general to multiple personas that are assignable to the instance of the automated assistant, but the LLM may additionally process given persona data that is specific to the given persona in generating the given assistant output, such as a given persona token, a given persona embedding, a given persona vector, and/or other data that can be utilized to tailor the given assistant response generated using the LLM that is general to multiple personas.

In various implementations, implementations can synchronize, for presentation to the user, the audible rendering of the synthesized speech corresponding to the stream of textual context and the utilization of the stream of visual cues in controlling the display of the client device and/or in controlling the visualized representation of the instance of the automated assistant. In some versions of those implementations, such as when the given assistant output is subsequently modified, the stream of modified textual content can be annotated with one or more corresponding visual cue timestamps that indicate when the stream of visual cues is to be utilized in controlling the display. For instance, the one or more corresponding visual cue timestamps can include corresponding start visual cue timestamps that indicate when one or more of the visual cues, included in the stream of visual cues, should start being utilized, corresponding pause visual cue timestamps that indicate when one or more of the visual cues, included in the stream of visual cues, should pause being utilized, corresponding resume visual cue timestamps that indicate when one or more of the visual cues, included in the stream of visual cues, should resume being utilized, corresponding end visual cue timestamps that indicate when one or more of the visual cues, included in the stream of visual cues, should stop being utilized, and/or other visual cues.

By using the techniques described herein, one or more technical advantages can be achieved. As one non-limiting example, the techniques described herein enable the automated assistant to not only provide more robust and contextually relevant streams of textual content that are synthesized for presentation to the user, but also robust and contextually streams of visual cues that are utilized in controlling the display of the client device and/or in controlling the visualized representation of the instance of the automated assistant. As a result, dialog sessions between the user and the automated assistant may better resonate with the user through utilization of the LLMs described herein. As a result, a quantity of instances that the user repeats a spoken utterance and/or a quantity of instances that the dialog sessions fails may be reduced, thereby reducing a quantity of computational and/or network resources consumed in the user repeating the spoken utterance and/or the dialog session failing.

As used herein, a "dialog session" may include a logically-self-contained exchange between a user and automated assistant (and in some cases, other human participants). The automated assistant may differentiate between multiple dialog sessions with the user based on various signals, such as passage of time between sessions, change of user context (e.g., location, before/during/after a scheduled meeting, etc.) between sessions, detection of one or more intervening interactions between the user and the client device other than dialog between the user and the automated assistant (e.g., the user switches applications for a while, the user walks away from then later returns to a standalone voice-activated product), locking/sleeping of the client device between sessions, change of client devices used to interface with the automated assistant, and so forth. Notably, during a given dialog session, a user can interact with the automated assistant using various input modalities, including, but not limited to, spoken input, typed input, and/or touch input.

The above description is provided as an overview of only some implementations disclosed herein for the sake of example. Those implementations, and other implementations, are described in additional detail herein.

It should be understood that techniques disclosed herein can be implemented locally on a client device, remotely by server(s) connected to the client device via one or more networks, and/or both.

BRIEF DESCRIPTION OF THE DRAWINGS

FIG. 5 depicts flowcharts illustrating example methods of generating persona training instances for utilization in training large language models that are utilized in dynamically adapting a given assistant output based on a given persona, from among a plurality of disparate personas, assigned to an automated assistant, assigned to the automated assistant, in accordance with various implementations.

DETAILED DESCRIPTION

Figure 1:
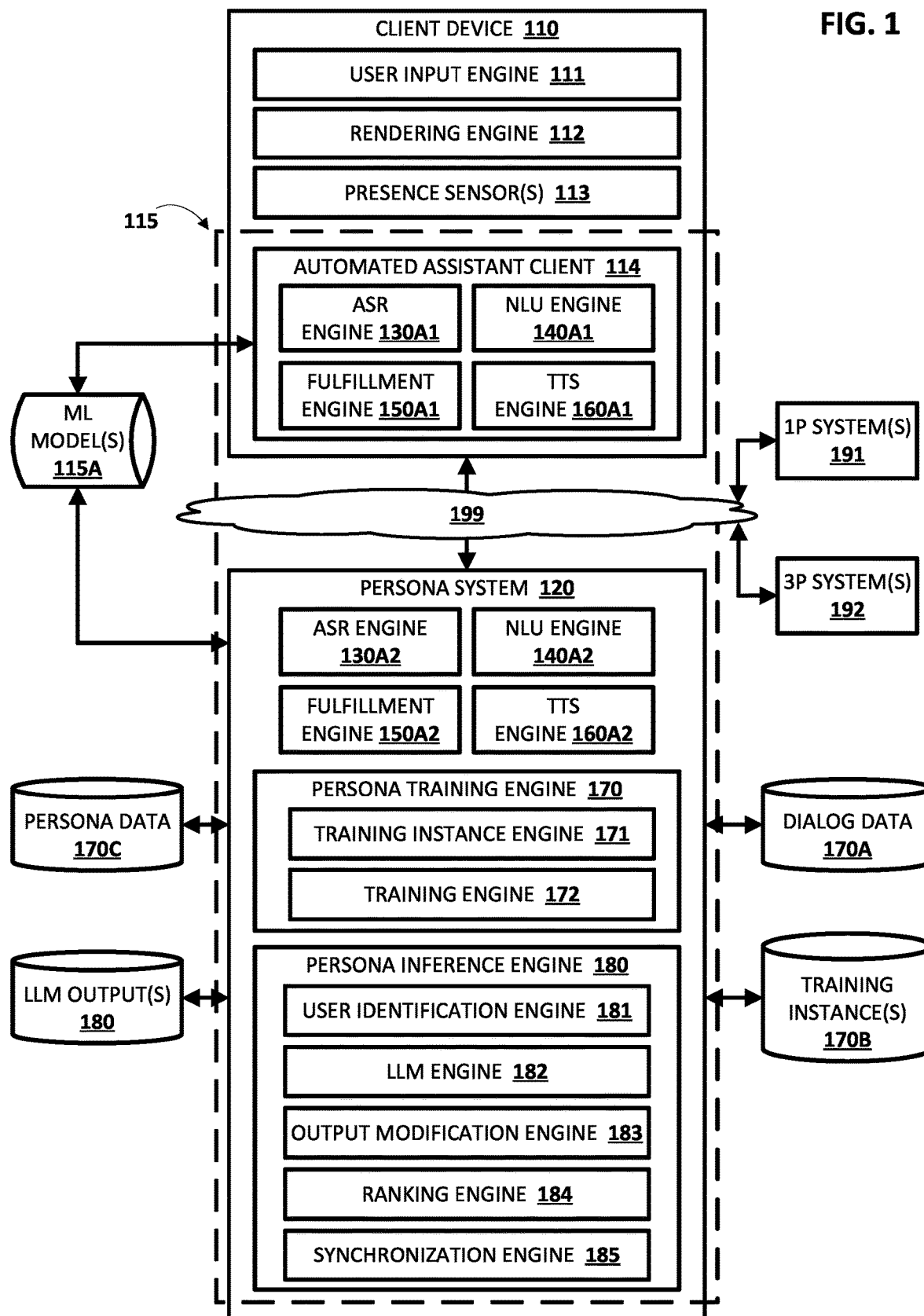
FIG. 1 depicts a block diagram of an example environment that demonstrates various aspects of the present disclosure, and in which implementations disclosed herein can be implemented.

Turning now to FIG. 1, a block diagram of an example environment 100 that demonstrates various aspects of the present disclosure, and in which implementations disclosed herein can be implemented is depicted. The example environment 100 includes a client device 110 and a persona system 120. In some implementations, the persona system 120 can be implemented locally at the client device 110. In additional or alternative implementations, the persona system 120 can be implemented remotely from the client device 110 as depicted in FIG. 1 (e.g., at remote server(s)). In these implementations, the client device 110 and the persona system 120 may be communicatively coupled with each other via one or more networks 199, such as one or more wired or wireless local area networks ("LANs," including Wi-Fi LANs, mesh networks, Bluetooth, near-field communication, etc.) or wide area networks ("WANs", including the Internet).

The client device 110 may be, for example, one or more of: a desktop computer, a laptop computer, a tablet, a mobile phone, a computing device of a vehicle (e.g., an in-vehicle communications system, an in-vehicle entertainment system, an in-vehicle navigation system), a standalone interactive speaker (optionally having a display), a smart appliance such as a smart television, and/or a wearable apparatus of the user that includes a computing device (e.g., a watch of the user having a computing device, glasses of the user having a computing device, a virtual or augmented reality computing device). Additional and/or alternative client devices may be provided.

The client device 110 can execute an automated assistant client 114. An instance of the automated assistant client 114 can be an application that is separate from an operating system of the client device 110 (e.g., installed "on top" of the operating system)—or can alternatively be implemented directly by the operating system of the client device 110. The automated assistant client 114 can interact with the persona system 120 implemented locally at the client device 110 or remotely and invoked via one or more of the networks 199 as depicted in FIG. 1. The automated assistant client 114 (and optionally by way of its interactions with other remote system (e.g., server(s)) may form what appears to be, from a user's perspective, a logical instance of an automated assistant 115 with which the user may engage in a human-to-computer dialog during a dialog session. An instance of the automated assistant 115 is depicted in FIG. 1, and is encompassed by a dashed line that includes the automated assistant client 114 of the client device 110 and the natural conversation system 120. It thus should be understood that a user that engages with the automated assistant client 114 executing on the client device 110 may, in effect, engage with his or her own logical instance of the automated assistant 115 (or a logical instance of the automated assistant 115 that is shared amongst a household or other group of users). For the sake of brevity and simplicity, the automated assistant 115 as used herein will refer to the automated assistant client 114 executing locally on the client device 110 and/or executing remotely at one or more remote servers that may implement the persona system 120.

In various implementations, the client device 110 may include a user input engine 111 that is configured to detect user input provided by a user of the client device 110 using one or more user interface input devices. For example, the client device 110 may be equipped with one or more microphones that generate streams of audio data, such as streams of audio data that capture spoken utterances of the user and/or other sounds in an environment of the client device 110. Additionally, or alternatively, the client device 110 may be equipped with one or more vision components that are configured to generate streams of vision data that capture images, videos, and/or certain movements (e.g., gestures) detected in a field of view of one or more of the vision components. Additionally, or alternatively, the client device 110 may be equipped with one or more touch sensitive components (e.g., a keyboard and mouse, a stylus, a touch screen, a touch panel, one or more hardware buttons, etc.) that are configured to generate signal(s) corresponding to touch input directed to the client device 110 (e.g., in implementations where the client device 110 includes a touchscreen display).

In various implementations, the client device 110 may include a rendering engine 112 that is configured to provide content for audible and/or visual presentation to a user of the client device 110 using one or more user interface output devices. For example, the client device 110 may be equipped with one or more speakers that enable audible content to be provided for audible presentation to the user via the client device 110. Additionally, or alternatively, the client device 110 may be equipped with a display or projector that enables visual content to be provided for visual presentation to the user via the client device 110.

In various implementations, the client device 110 may include one or more presence sensors 113 that are configured to provide, with approval from corresponding user(s), signals indicative of detected presence, particularly human presence. In some of those implementations, the automated assistant 115 can identify the client device 110 (or another computing device associated with a user of the client device 110) to satisfy a spoken utterance based at least in part of presence of the user at the client device 110 (or at another computing device associated with the user of the client device 110). The spoken utterance can be satisfied by rendering given assistant output (e.g., via the rendering engine 112) at the client device 110 and/or other computing device(s) associated with the user of the client device 110, by causing the client device 110 and/or other computing device(s) associated with the user of the client device 110 to be controlled, and/or by causing the client device 110 and/or other computing device(s) associated with the user of the client device 110 to perform any other action to satisfy the spoken utterance. As described herein, the automated assistant 115 can leverage data determined based on the presence sensors 113 in determining the client device 110 (or other computing device(s)) based on where a user is near or was recently near, and provide corresponding commands to only the client device 110 (or those other computing device(s)). In some additional or alternative implementations, the automated assistant 115 can leverage data determined based on the presence sensors 113 in determining whether any user(s) (any users or specific users) are currently proximal to the client device 110 (or other computing device(s)), and can optionally suppress provision of data to and/or from the client device 110 (or other computing device(s)) based on the user(s) that are proximal to the client device 110 (or other computing device(s)).

The presence sensors 113 may come in various forms. For example, the client device 110 can utilize one or more of the user interface input components described above with respect to the user input engine 111 to detect presence of the user. Additionally, or alternatively, the client device 110 may be equipped with other types of light-based presence sensors 113, such as passive infrared ("PIR") sensors that measure infrared ("IR") light radiating from objects within their fields of view.

Additionally, or alternatively, in some implementations, the presence sensors 113 may be configured to detect other phenomena associated with human presence or device presence. For example, in some embodiments, the client device 110 may be equipped with a presence sensor 113 that detects various types of wireless signals (e.g., waves such as radio, ultrasonic, electromagnetic, etc.) emitted by, for instance, other computing devices carried/operated by a user (e.g., a mobile device, a wearable computing device, etc.) and/or other computing devices. For example, the client device 110 may be configured to emit waves that are imperceptible to humans, such as ultrasonic waves or infrared waves, that may be detected by other computing device(s) (e.g., via ultrasonic/infrared receivers such as ultrasonic-capable microphones).

Additionally, or alternatively, the client device 110 may emit other types of human-imperceptible waves, such as radio waves (e.g., Wi-Fi, Bluetooth, cellular, etc.) that may be detected by other computing device(s) carried/operated by a user (e.g., a mobile device, a wearable computing device, etc.) and used to determine the user's particular location. In some implementations, GPS and/or Wi-Fi triangulation may be used to detect a person's location, e.g., based on GPS and/or Wi-Fi signals to/from the client device 110. In other implementations, other wireless signal characteristics, such as time-of-flight, signal strength, etc., may be used by the client device 110, alone or collectively, to determine a particular user's location based on signals emitted by the other computing device(s) carried/operated by the user. Additionally, or alternatively, in some implementations, the client device 110 may perform speaker identification (SID) to recognize a user from their voice and/or facial identification (FID) to recognize a user from vision data that captures a face of the user.

In some implementations, movement of the speaker may then be determined, e.g., by the presence sensors 113 of the client device 110 (and optionally GPS sensors, *Soli* chips, and/or accelerometers of the client device 110). In some implementations, based on such detected movement, a location of the user may be predicted, and this location may be assumed to be the user's location when any content is caused to be rendered at the client device 110 and/or other computing device(s) based at least in part on proximity of the client device 110 and/or other computing device(s) to the user's location. In some implementations, the user may simply be assumed to be in the last location at which he or she engaged with the automated assistant 115, especially if not much time has passed since the last engagement.

Further, the client device 110 and/or the persona system 120 may include one or more memories for storage of data and/or software applications, one or more processors for accessing data and executing the software applications, and/or other components that facilitate communication over one or more of the networks 199. In some implementations, one or more of the software applications can be installed locally at the client device 110, whereas in other implementations one or more of the software applications can be hosted remotely (e.g., by one or more servers) and can be accessible by the client device 110 over one or more of the networks 199.

In some implementations, the operations performed by the automated assistant 115 may be implemented locally at the client device 110 via the automated assistant client 114. As shown in FIG. 1, the automated assistant client 114 may include an automatic speech recognition (ASR) engine 130A1, a natural language understanding (NLU) engine 140A1, a fulfillment (LLM) engine 150A1, and a text-to-speech (US) engine 160A1. In some implementations, the operations performed by the automated assistant 115 may be distributed across multiple computer systems, such as when the persona system 120 is implemented remotely from the client device 110 as depicted in FIG. 1. In these implementations, the automated assistant 115 may additionally or alternatively utilize ASR engine 130A2, NLU engine 140A2, fulfillment engine 150A2, and TTS engine 160A2 of the persona system 120.

Each of these engines may be configured to perform one or more functions. For example, the ASR engine 130A1 and/or 130A2 can process, using streaming ASR model(s) stored in machine learning (ML) model(s) database 115A (e.g., a recurrent neural network (RNN) model, a transformer model, and/or any other type of ML model capable of performing ASR), streams of audio data that capture spoken utterances and that are generated by microphone(s) of the client device 110 to generate corresponding streams of ASR output. Notably, the streaming ASR model can be utilized to generate the corresponding streams of ASR output as the streams of audio data are generated. Further, the NLU engine 140A1 and/or 140A2 can process, using NLU model(s) stored in the ML model(s) database 115A (e.g., a long short-term memory (LSTM), gated recurrent unit (GRU), and/or any other type of RNN or other ML model capable of performing NLU) and/or grammar-based rule(s), the corresponding streams of ASR output to generate corresponding streams of NLU output. Moreover, the fulfillment engine 150A1 and/or 150A2 can cause the corresponding streams of NLU output to be processed to generate corresponding streams of fulfillment data. For instance, the automated assistant 115 can generate and transmit one or more corresponding structured request to one or more first-party (1P) systems 191 over one or more of the networks 199 (or one or more application programming interfaces (APIs)) and/or one or more third-party (3P) systems 192 over one or more of the networks, and receive corresponding fulfillment data from one or more of the 1P systems 191 and/or 3P systems 192 to generate the corresponding streams of fulfillment data. As used herein, the one or more 1P systems 191 refer to any system that is developed and/or maintained by the same entity that develops and/or maintains the automated assistant 115, whereas the one or more 3P systems refer to any system that is developed and/or maintained by an entity that is distinct from the entity that develops and/or maintains the automated assistant 115.

The one or more corresponding structured requests can include, for example, NLU data included in the corresponding streams of NLU output. The corresponding streams of fulfillment data can correspond to, for example, corresponding given assistant outputs that are predicted to be responsive to spoken utterances captured in the corresponding streams of audio data processed by the ASR engine 130A1 and/or 130A2. Lastly, the TTS engine 160A1 and/or 160A2 can process, using TTS model(s) stored in the ML model(s) database 115A, corresponding streams of textual content (e.g., text formulated by the automated assistant 115) to generate synthesized speech audio data that includes computer-generated synthesized speech. The corresponding streams of textual content can correspond to, for example, one or more given assistant outputs, one or more of modified given assistant outputs, and/or any other textual content described herein.

Notably, the ML model(s) stored in the ML model(s) database 115A can be on-device ML models that are stored locally at the client device 110, remote ML models that are executed remotely from the client device (e.g., at remote server(s)), or shared ML models that are accessible to both the client device 110 and/or remote systems (e.g., the remote server(s)). In additional or alternatively implementations, corresponding streams of synthesized speech audio data corresponding to the one or more given assistant outputs, the one or more of modified given assistant outputs, and/or any other textual content described herein can be pre-cached in memory or one or more databases accessible by the client device 110, such that the automated assistant need not use the TTS engine 160A1 and/or 160A2 to generate the corresponding synthesized speech audio data.

In various implementations, the corresponding streams of ASR output can include, for example, streams of ASR hypotheses (e.g., term hypotheses and/or transcription hypotheses) that are predicted to correspond to spoken utterance(s) of a user that are captured in the corresponding streams of audio data, one or more corresponding predicted measures (e.g., probabilities, log likelihoods, and/or other values) for each of the ASR hypotheses included in the streams of ASR hypotheses, a plurality of phonemes that are predicted to correspond to spoken utterance(s) of a user that are captured in the corresponding streams of audio data, and/or other ASR output. In some versions of those implementations, the ASR engine 130A1 and/or 130A2 can select one or more of the ASR hypotheses as corresponding recognized text that corresponds to the spoken utterance(s) (e.g., selected based on the corresponding predicted measures).

In various implementations, the corresponding streams of NLU output can include, for example, streams of annotated recognized text that includes one or more annotations of the recognized text for one or more (e.g., all) of the terms of the recognized text, one or more corresponding predicted measures (e.g., probabilities, log likelihoods, and/or other values) for NLU output included in the streams of NLU output, and/or other NLU output. For example, the NLU engine 140A1 and/or 140A2 may include a part of speech tagger (not depicted) configured to annotate terms with their grammatical roles. Additionally, or alternatively, the NLU engine 140A1 and/or 140A2 may include an entity tagger (not depicted) configured to annotate entity references in one or more segments of the recognized text, such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. The entity tagger may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

Additionally, or alternatively, the NLU engine 140A1 and/or 140A2 may include a coreference resolver (not depicted) configured to group, or "cluster," references to the same entity based on one or more contextual cues. For example, the coreference resolver may be utilized to resolve the term "them" to "buy theatre tickets" in the natural language input "buy them", based on "theatre tickets" being mentioned in a client device notification rendered immediately prior to receiving input "buy them". In some implementations, one or more components of the NLU engine 140A1 and/or 140A2 may rely on annotations from one or more other components of the NLU engine 140A1 and/or 140A2. For example, in some implementations the entity tagger may rely on annotations from the coreference resolver in annotating all mentions to a particular entity. Also, for example, in some implementations, the coreference resolver may rely on annotations from the entity tagger in clustering references to the same entity.

Although FIG. 1 is described with respect to a single client device having a single user, it should be understood that is for the sake of example and is not meant to be limiting. For example, one or more additional client devices of a user can also implement the techniques described herein. For instance, the client device 110, the one or more additional client devices, and/or any other computing devices of the user can form an ecosystem of devices that can employ techniques described herein. These additional client devices and/or computing devices may be in communication with the client device 110 (e.g., over the network(s) 199). As another example, a given client device can be utilized by multiple users in a shared setting (e.g., a group of users, a household). For example, multiple users co-located in a household may each utilize a given client device, and each of the multiple users may have a separate automated assistant account that is personal to each of the multiple users. In these examples, the automated assistant 115 can utilize one or more user identification techniques described herein to identify a given user, from among the multiple users, and tailor any dialog session accordingly by utilizing a given persona that the given user assigned to the automated assistant 115 (e.g., which may differ from another persona assigned to the automated assistant 115 by another one of the multiple users), utilizing information that is specific to the given user (e.g., calendar information for the given user, mobile device information from a mobile device of the given user (e.g., incoming electronic communications directed to the given user), etc.), and/or other information to tailor the dialog session to the given user.

As described herein, the automated assistant 115 can utilize the persona system 120 to generate given assistant outputs that are specific to a given persona, of a plurality of disparate personas, that is assigned to the automated assistant 115. Each of the given assistant outputs can include, for example, a corresponding stream of textual content that is determined based on a vocabulary that is specific to the given persona and that is synthesized (e.g., using the TTS engine 160A1 and/or 160A2) using a set of prosodic properties that is specific to the given persona, and a corresponding stream of visual cues that is utilized in controlling a display of the client device 110 (e.g., as described with respect to FIGS. 6A and 6B) and/or in controlling a corresponding visualized representation of the instance of the automated assistant 115 that is associated with the given persona. The given persona that is assignable to the automated assistant can be embodied by the vocabulary that is specific to the given persona and that is utilized in generating the corresponding stream of textual content, the set of prosodic properties that is specific to the given persona, the corresponding stream of visual cues, and/or the corresponding visualized representation of the instance of the automated assistant 115 that is associated with the given persona. Accordingly, for an additional persona that is distinct from the given persona, one or more of these may differ to embody the additional persona in a manner that is distinct from the given persona.

In various implementations, and as depicted in FIG. 1, the persona system 120 can additionally, or alternatively, include a persona training engine 170 and a persona inference engine 180. The persona training engine 170 can include, for example, a training instance engine 171 and a training engine 172. Further, the persona inference engine 180 can include, for example, a user identification engine 181, an LLM engine 182, an output modification engine 183, a ranking engine 184, and a synchronization engine 185. These various engines of the persona system 120 are described in more detail with respect to FIGS. 2-5. Although particular engines are depicted in FIG. 1, it should be understood that is for the sake of example and is not meant to be limiting. For example, various engines depicted in FIG. 1 may be combined and/or omitted in various implementations. As one non-limiting example, one or more of the LLM engine 182, the output modification engine 183, the ranking engine 184, and/or the synchronization engine 185 may be combined in implementations where a given LLM that is specific to a given persona is utilized in generating a given assistant output that is specific to the given persona. As another non-limiting example, the user identification engine 181 may be omitted in implementations where the client device 110 is personal to a user (e.g., a mobile device of the user).

In some implementations, the persona training instance engine 171 can generate given persona training instances based on dialog data (e.g., stored in dialog data database 170A) for a plurality of disparate personas that are assignable to the automated assistant 115, and store the given persona training instances in one or more databases that are accessible to the persona training engine 170 (e.g., training instance(s) database 170B). The dialog data can include, for example, any data that may be utilized in the given persona training instances, such as corresponding streams of audio data that capture corresponding spoken utterances, corresponding streams of ASR output generated based on processing the corresponding streams of audio data, corresponding streams of NLU output generated based on processing the corresponding streams of ASR output, corresponding contexts of corresponding dialog sessions in which the corresponding spoken utterances were received, corresponding streams of vision data capture a human or character that provided the corresponding spoken utterances, corresponding developer inputs that annotate the dialog data, and/or any other data that may be utilized in the given persona training instances. Generating the given persona training instances based on this dialog data is described in more detail herein (e.g., with respect to FIG. 5).

In these implementations, the training engine 172 can train instances of a given LLM (e.g., stored in the ML model(s) database 115A) that are specific to one or more of the plurality of disparate personas. For instance, the given persona training instances can be indexed (e.g., in the training instance(s) database 170B) by each of the plurality of disparate personas, such that each of the plurality of disparate personas are associated with a corresponding set of given persona training instances. Accordingly, the training engine 172 can obtain the corresponding given persona training instances (e.g., from the training instance(s) database 170B) that are for a given persona to train an instance of the given LLM that specific to the given persona, obtain the corresponding given persona training instances (e.g., from the training instance(s) database 170B) that are for an additional persona to train an additional instance of the given LLM that specific to the additional persona, and so on. Training the instance of the given LLM that is specific to the given persona is described in more detail herein (e.g., with respect to FIG. 4). Accordingly, in these implementations, the instances of the given LLM can be subsequently utilized in generating given assistant responses that are specific to the a given persona that the user has assigned to the instance of the automated assistant 115 based on the instance of the given LLM being trained specifically for the given persona.

In additional or alternative implementations, a given LLM that is general to multiple of the disparate personas (e.g., all of the disparate personas or a subset thereof) can be utilized in generating given assistant responses. In these implementations, the given LLM may additionally process given persona data (e.g., stored in persona data database 170C) for a given persona that is assigned to the automated assistant 115. In these implementations, the given persona data may correspond to, for example, a given persona token, a given persona embedding, a given persona vector, and/or other data that may be utilized to embody a given persona that is specific to the instance of the automated assistant 115. In these implementations, the given persona data may be defined by a developer associated with the automated assistant 115 and/or the persona system, and/or learned using various machine learning techniques. Accordingly, in these implementations, the given LLM can be utilized in generating given assistant responses that are specific to the a given persona that the user has assigned to the instance of the automated assistant 115 based on given persona data that is specific to the given persona.

In some implementations, the user identification engine 181 can be utilized to determine an identity of a user that provided a spoken utterance captured in a stream of audio data. The user identification engine 181 can determine the identity of the user that provided the spoken utterance captured in the stream of audio data based on processing the stream of audio data (e.g., using speaker identification (SID) model(s)), processing a stream of vision data that captures the user that provided the spoken utterance (e.g., using face identification (FID) model(s)), based on an automated assistant account associated with the automated assistant that is active at the client device 110, and/or other by using other techniques. Identifying the user that provided the spoken utterance captured in the stream of audio data is described in more detail herein (e.g., with respect to FIGS. 2 and 3).

Figure 2:
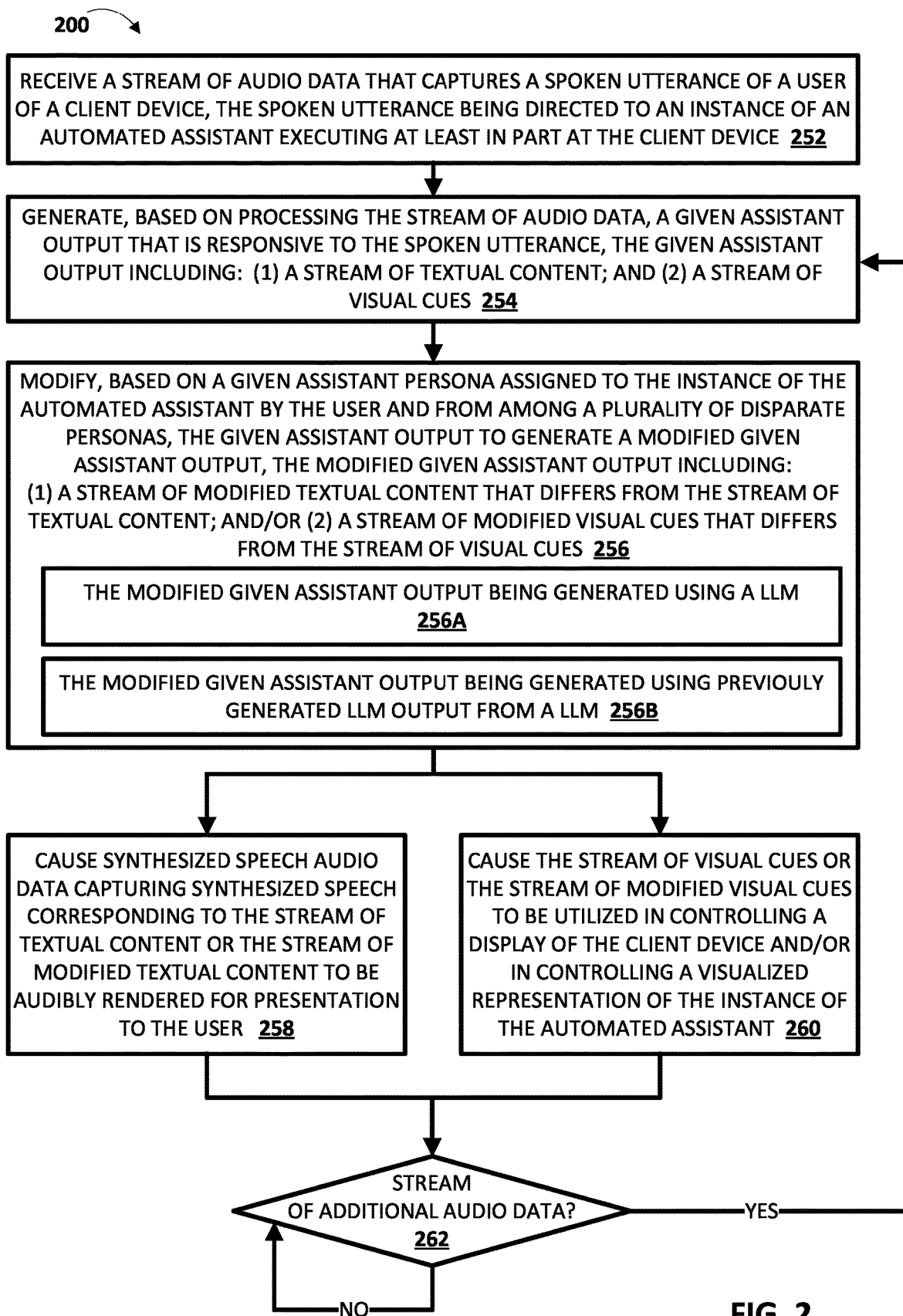
FIG. 2 depicts a flowchart illustrating an example method of dynamically adapting a given assistant output based on a given persona, from among a plurality of disparate personas, assigned to an automated assistant, in accordance with various implementations.
Figure 3:
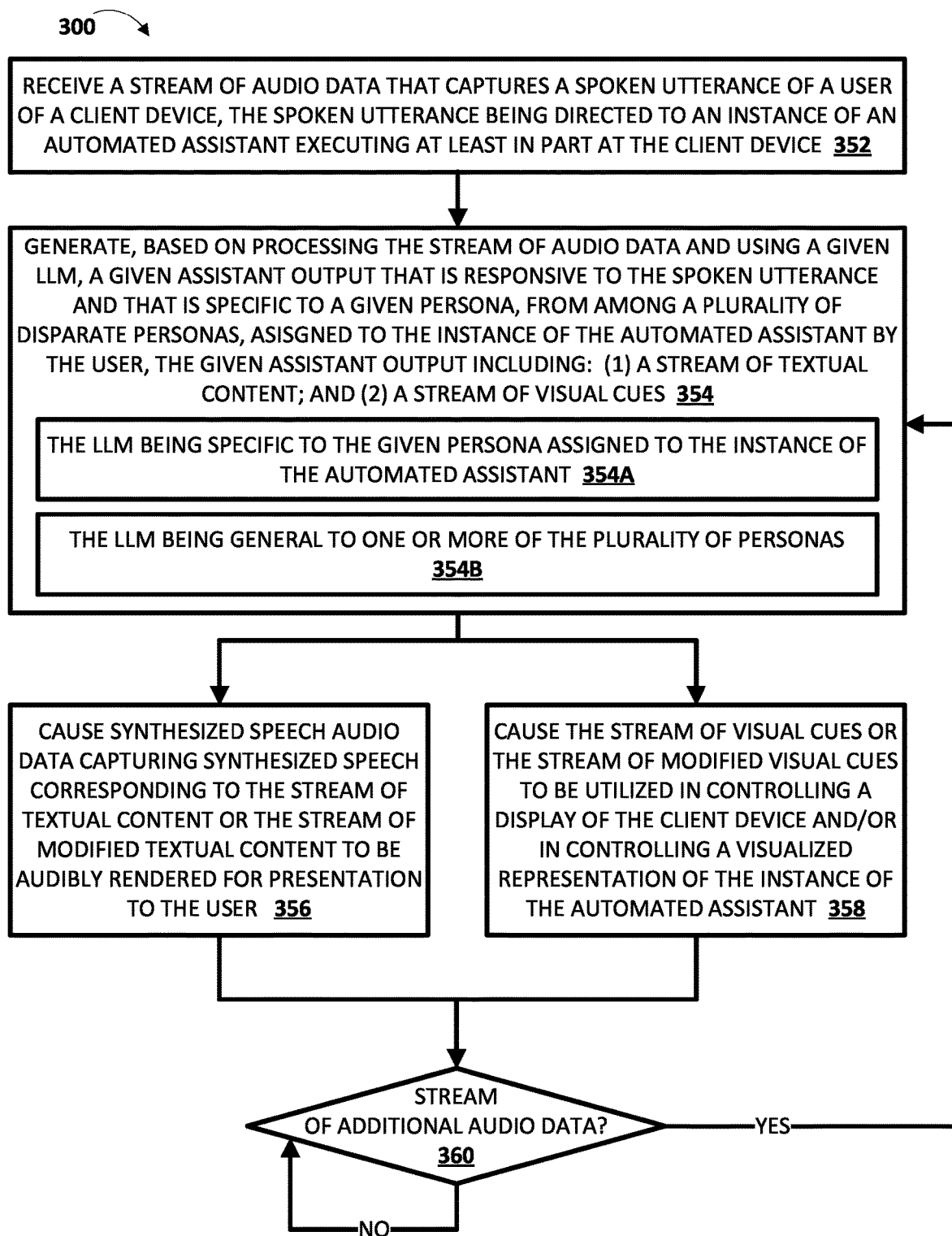
FIG. 3 depicts a flowchart illustrating another example method of dynamically adapting a given assistant output based on a given persona, from among a plurality of disparate personas, assigned to an automated assistant, in accordance with various implementations.

In some implementations, the LLM engine 182 can utilize instances of given LLMs to generate given assistant outputs to be provided for presentation to the user directly (e.g., as described with respect to FIG. 3). In additional or alternative implementations, the LLM engine 182 and/or the output modification engine 183 can subsequently modify given assistant output utilize instances of given LLMs to generate given assistant outputs to be provided for presentation to the user directly (e.g., as described with respect to FIG. 2). Notably, in these implementations, the LLM engine 182 may actively process data in response to receiving a stream of audio data that captures a spoken utterance. Accordingly, these implementations may utilize the LLMs in an online manner. In additional or alternative implementations, the LLM engine 182 can utilize previously generated LLM outputs (e.g., stored in LLM output(s) database 180) that were previously generated based on the same or similar spoken utterance captured in the stream of audio data (e.g., as described with respect to FIG. 2).

In some implementations, the ranking engine 184 can rank a plurality of assistant outputs generated by the LLM engine 182 and/or the output modification engine 183, and select a given assistant output to be provided for presentation to the user based on the ranking. The ranking engine 184 can rank the plurality of assistant output based on various ranking criteria. The ranking criteria can include, for example, one or more predicted measures (e.g., ASR predicted measures generated in generating the stream of ASR output, NLU predicted measures generated in generating the stream of NLU output, etc.) that are indicative of how responsive each of the plurality of assistant outputs are predicted to be responsive to the spoken utterance, one or more intents included in the corresponding stream of NLU output, and/or other ranking criteria.

In some implementations, the synchronization engine 185 can be utilized to synchronize, for presentation to the user of the client device 110, the given assistant output. For example, a stream of visual cues, of the given assistant output, to be utilized in controlling the display of the client device 110 and/or the visualized representation of the automated assistant 115 can be defined with respect a stream of textual content, of the given assistant output, to be synthesized for audible presentation to the user of the client device 110. For instance, the synchronization can annotate the stream of textual content with corresponding visual cue timestamps that indicate when the visual cues should be utilized in controlling the display of the client device 110 and/or the visualized representation of the automated assistant 115. Synchronizing the given assistant output for presentation to the user is described in more detail herein (e.g., with respect to FIGS. 2, 3, 6A, 6B, 7A, and 7B).

Turning now to FIG. 2, a flowchart illustrating an example 200 method of dynamically adapting a given assistant output based on a given persona, from among a plurality of disparate personas, assigned to an automated assistant is depicted. For convenience, the operations of the method 200 are described with reference to a system that performs the operations. This system of the method 200 includes one or more processors, memory, and/or other component(s) of computing device(s) (e.g., client device 110 of FIGS. 1, 6A, 6B, 7A, and 7B, persona system 120, and/or computing device 810 of FIG. 8, one or more servers, and/or other computing devices). Moreover, while operations of the method 200 are shown in a particular order, this is not meant to be limiting. One or more operations may be reordered, omitted, and/or added.

At block 252, the system receives a stream of audio data that captures a spoken utterance of a user of a client device, the spoken utterance being directed to an instance of an automated assistant executing at least in part at the client device. The stream of audio data can be generated, for example, via one or more microphones of the client device. In some implementations, the system may receive the stream of audio data in response to the instance of the automated assistant being explicitly invoked, such as based on detection of a particular word or phrase at the client device (e.g., "Assistant", "Hey Assistant", etc.), based on actuation of a button at the client device (e.g., a hardware button of the client device, a software button of a display of the client device), based on detection of a particular gesture at the client device, and/or using other invocation techniques. In other implementations, the system may receive the stream of audio data without the instance of the automated assistant being explicitly invoked, such as based on the stream of audio data being received while the user is gazing at the client device and/or using other techniques.

In various implementations, the system may implement one or more user identification techniques to identify the user of the client device that provided the spoken utterance. For example, the system can process the stream of audio data using speaker identification (SID) model(s) (e.g., text dependent (TD) SID model(s) and/or text independent (TI) SID model(s)) to identify the user of the client device based on previously generated speaker embeddings. Additionally, or alternatively, the system can process a stream of vision data generated by one or more vision sensors of the client device (e.g., immediately before the stream of audio data is received, while the stream of audio data is being received, and/or immediately after the stream of audio data is received) used face identification (FID) model(s) to identify the user based on previously generated face embeddings. Additionally, or alternatively, the system can identify the user based on a user account (e.g., a user account associated with the instance of the automated assistant) that is active at the client device.

At block 254, the system generates, based on processing the stream of audio data, a given assistant output that is response to the spoken utterance, the given assistant output including: (1) a stream of textual content; and (2) a stream of visual cues. For example, the system can process the stream of audio data, using ASR model(s), to generate a stream of ASR output, such as one or more recognized terms corresponding to the spoken utterance captured in the stream of audio data. Further, the system can process the stream of ASR output, using NLU model(s), to generate a stream of NLU output, such as one or more intents and corresponding slot value for one or more parameters associated with one or more of the intents.

In some implementations, the system can generate, based on at least the stream of NLU output, one or more structured requests to be transmitted to one or more 1P systems and/or one or more 3P systems. In response to transmitting one or more of the structured requests to the one or more 1P systems and/or one or more 3P systems, the system can receive responsive content from the one or more 1P systems and/or one or more 3P systems. The response content can be utilized in generating the stream of textual content and the stream of visual cues included in the given assistant output. For example, if the spoken utterance corresponds to "Assistant, what's the weather", the stream of audio data capturing the spoken utterance can be processed to obtain a stream of textual content (e.g., "The weather today is rainy and 45") to be synthesized for audible presentation to the user and a stream of visual cues (e.g., an information card associated with the weather). In some versions of those implementations, the system can utilize the stream of textual content and the stream of visual cues generated based on the responsive as the given assistant output. In additional or alternative versions of those implementations, the system may further process the stream of textual content and the stream of visual cues that was generated based on the responsive content from the one or more 1P systems and/or one or more 3P systems and/or the responsive content from the one or more 1P systems and/or one or more 3P systems, using an LLM (e.g., in an online manner as described herein) or previously generated LLM output that was previously generated the same spoken utterance or a similar spoken utterance (e.g., in an offline manner as described herein), to generate the stream of textual content and the stream of visual cues utilized as the given assistant output (e.g., "The weather today is rainy and 45, don't forget your umbrella or you might catch a cold"). Put another way, in these implementations, the stream of textual content and the stream of visual cues utilized as the given assistant output can correspond to textual content and visual content generated using a typical automated assistant pipeline that does not include any LLM, or can correspond to textual content and visual content that is generated using the typical automated assistant pipeline, but augmented using an LLM or previously generated LLM output.

In additional or alternative implementations, the system can process the stream of audio data and/or the stream of NLU output, using an LLM (e.g., in an online manner as described herein) or previously generated LLM output (e.g., in an offline manner as described herein), and without generating and transmitting any structured requests to the one or more 1P systems and/or one or more 3P systems. Put another way, in these implementations, the stream of textual content and the stream of visual cues utilized as the given assistant output can be generated directly based on the stream of audio data and/or the stream of NLU output.

At block 256, the system modifies, based on a given assistant persona assigned to the instance of the automated assistant by the user and from among a plurality of disparate personas, the given assistant output to generate a modified given assistant output, the modified given assistant output including: (1) a stream of modified textual content that differs from the stream of textual content; and/or (2) a stream of modified visual cues that differs from the stream of visual cues. In generating the modified given assistant output, the system may also consider a context of a dialog session (if any) in which the spoken utterance is provided by the user. The given persona can include, for example, a given vocabulary that is specific to the given persona and that is utilized in modifying the stream of textual content to generate the stream of modified textual content, a given set of prosodic properties that is specific to the given persona and that is utilized in subsequently synthesizing the stream of modified textual content for audible presentation to the user, and/or a given set of visual cues that is specific to the given persona and that is utilized in modifying the stream of visual cues to generate the stream of modified visual cues. The context of the dialog session can be determined based on one or more contextual signals that include, for example, a time of day, a day of week, a location of the client device, ambient noise detected in an environment of the client device, user profile data, software application data, environmental data about a known environment of the user of the client device, dialog history of the dialog session between the user and the automated assistant, and/or other contextual signals, and can be represented in various manners (e.g., a vector representation, a semantic token representation, and/or other representations). Notably, each of the other disparate personas can also be associated with a corresponding vocabulary, a corresponding set of prosodic properties, and/or a corresponding set of visual cues.

In some implementations, the given persona may be assigned to the instance of the automated assistant when the user initially configures the client device. For example, in setting up the client device, the user may have been prompted to select the given persona, from among the plurality of disparate personas, to be assigned to the instance of the automated assistant. In additional or alternative implementations, the given persona may be assigned to the instance of the automated assistant via settings of an automated assistant application that is associated with the instance of the automated assistant. For example, the user may navigate to the settings of the automated assistant application that is associated with the automated instance of the automated assistant and be able to select the given persona from among the plurality of different personas. In additional or alternative implementations, the given persona may be assigned to the instance of the automated assistant based on a voice command included in a spoken utterance that is directed to the instance of the automated assistant. For example, the user may provide a spoken utterance of "talk to Walter" (e.g., where "Walter" is a reference to the given persona (e.g., a butler persona)) or "pretend you are "Assistant, pretend you are Blackbeard" (e.g., where "Blackbeard" is a reference to the given persona (e.g., a pirate persona)). In these examples, the system may process audio data capturing the spoken utterance to identify the voice command to assign the given persona to the instance of the automated assistant using various components described herein (e.g., ASR, NLU, fulfillment, etc.).

In some implementations, the given persona may be assigned to the client device such that multiple different users that are associated with the client device interact with the instance of the automated assistant that is assigned the given persona. In additional or alternative implementations, the given persona may be assigned to the user of the client device such that other users of the client device can assign different personas to be utilized by the instance of the automated assistant when interacting with the automated assistant via the client device. In these implementations, the identity of the user (e.g., determined as described above with respect to the operations of block 252) can be utilized to determine which persona is assigned to the instance of the automated assistant for the multiple different users. Put another way, the given persona may be assigned to the client device such that the given persona is utilized when interacting with each user of the client device, or the given persona may be assigned to a particular user of the client device (e.g., the user that provided the spoken utterance captured in the stream of audio data) such that different personas are utilized when interacting with different users of the client device. Notably, the given persona assigned to the instance of the automated assistant may be associated with a visualized representation as described herein such that a stream of visual cues may be utilized in controlling both the visualized representation and a display of the client device, whereas other personas that are assignable to the automated assistant may lack a visualized representation such that a stream of visual cues may only be utilized in controlling a display of the client device.

In some implementations, and as indicated at block 256A, the modified given assistant output may be generated using an LLM in an online manner (e.g., in response to receiving the spoken utterance and causing the LLM to process the given assistant output). In these implementations, the system can process the given assistant output, using one or more LLMs, and optionally the context of the dialog session in which the spoken utterance was provided to generate the modified assistant output. For example, the system can cause the LLM engine 182 from FIG. 1 to process, using one or more LLMs, the stream of textual content of the given assistant output, the stream of visual cues of the given assistant output, data generated in processing the stream of audio (e.g., the stream of ASR output, the stream of NLU output, etc.), and/or a context of the dialog session in which the spoken utterance was provided by the user to generate the set of given modified assistant output. Put another way, the given assistant output may have a limited vocabulary and a generic personality in terms of the limited vocabulary and prosodic properties utilized in synthesizing speech. However, in generating the modified given assistant output, the system injects the given persona into the instance of the automated assistant, thereby providing the instance of the automated assistant with a much larger vocabulary that is specific to the given persona as a function of using the one or more LLMs in generating the modified given assistant output, much greater variance in terms of prosodic properties associated with the given persona in generating the modified given assistant output, and much more robust and interactive visual cues associated with the given persona in generating the modified given assistant output as compared to the given assistant output. As a result, the modified given assistant output may better resonate with the user engaged in the dialog session with the instance of the automated assistant.

In additional or alternative implementations, and as indicated at block 256B, the modified given output may be generated using previously generated LLM output from an LLM in an offline manner (e.g., in response to receiving the spoken utterance, but not causing the LLM to process the given assistant output). In these implementations, the system can determine that the spoken utterance that is captured in the stream of audio data corresponds to a prior spoken utterance for which the previously generated LLM output has been previously generated, and optionally that the context of the dialog session in which the spoken utterance was provided by the user corresponds to a prior context of a prior dialog session in which the prior spoken utterance. Further, the system can obtain the previously generated LLM output since it may be indexed based on the prior the spoken utterance and the prior context. Similarly, these techniques result in the instance of the automated assistant having a much larger vocabulary that is specific to the given persona as a function of using the one or more LLMs in generating the modified given assistant output, much greater variance in terms of prosodic properties associated with the given persona in generating the modified given assistant output, and much more robust and interactive visual cues associated with the given persona in generating the modified given assistant output as compared to the given assistant output. As a result, the modified given assistant output may better resonate with the user engaged in the dialog session with the instance of the automated assistant.

At block 258, the system causes synthesized speech audio data capturing synthesized speech corresponding to the stream of textual content or the stream of modified textual content to be audibly rendered for presentation to the user. For example, the system can process the stream of textual content, using TTS model(s), to generate the synthesized speech audio data capturing the synthesized speech corresponding to the stream of textual content (e.g., in instances where the stream of textual content is not modified) or the stream of modified textual content (e.g., in instances where the stream of textual content is modified). Notably, the system can utilize the given set of prosodic properties assigned to the given persona in generating the synthesized speech audio data to reflect a given tone, rhythm, pitch, intonation, and/or other prosodic properties associated with the given persona. Further, the system can cause the synthesized speech audio data to be audibly rendered for presentation to the user via one or more speakers of the client device.

At block 260, the system causes the stream of visual cues or the stream of modified visual cues to be utilized in controlling a display of the client device and/or in controlling a visualized representation of the instance of the automated assistant. In some implementations, the stream of visual cues or the stream of modified visual cues are utilized in controlling the display of the client device. In these implementations, the stream of visual cues or the stream of modified visual cues can cause the display of the client device to visually render one or more screen animations for presentation to the user (e.g., as described with respect to FIGS. 6A and 6B). In additional or alternative implementations, the stream of visual cues or the modified stream of visual cues are utilized in controlling the visualized representation of the instance of the automated assistant. The visualized representation of the instance of the automated assistant can be, for example, an avatar corresponding to an animated person (e.g., real or fictional), character (e.g., a butler, a pirate, a chef), object (e.g., animated assistant dots), animal, and/or any other visualized representation. In these implementations, the stream of visual cues or the stream of modified visual cues can cause the visualized representation of the automated assistant to perform one or more animated physical gesture motions. These physical gesture motions can include, for example, general physical gesture motions that are general across all visualized representations (e.g., waving, entering the display of the client device, exiting the display of the client device, etc.), persona specific physical gesture motions that are specific to the given persona assigned to the automated assistant (e.g., a signature move of a fictional character), emotions portrayed by the visualized representation (e.g., happy, sad, angry, etc.) that may optionally be coupled with the above general or persona specific physical gesture motions, facial expressions (e.g., smiling, frowning, etc.) that may optionally be coupled with the above general or persona specific physical gesture motions, and/or other physical gesture motions. In these implementations, the stream of visual cues or the stream of modified visual cues can cause the visualized representation of the instance of the automated assistant to visually perform the animated physical gesture motions (e.g., as described with respect to FIGS. 7A and 7B).

In various implementations, the system can synchronize, for presentation to the user, the audible rendering of the synthesized speech corresponding to the stream of visual cues or the stream of modified textual context and the utilization of the stream of visual cues or the modified stream of visual cues in controlling the display of the client device and/or for controlling the visualized representation of the instance of the automated assistant. Notably, in implementations that utilize LLMs or LLM outputs in generating the given assistant output and/or the modified given assistant output, this synchronization can be automatically performed by those LLMs (e.g., via the LLM engine 182 of FIG. 1) that are trained in the manner described herein (e.g., with respect to FIGS. 4 and 5) and/or the LLM output generated by those LLMs. In other implementations, this synchronization may be performed by a dedicated synchronization engine and/or other component of the system that is capable of synchronizing the stream of visual cues or the stream of modified textual context and the utilization of the stream of visual cues or the modified stream of visual cues (e.g., via the synchronization engine 185 of FIG. 1).

For example, assume that the user provides the spoken utterance of "Hi Assistant", assume that audio capturing the spoken utterance is processed in the manner described above with respect to the operations of blocks 254 and 256, and assume that the user has assigned a given persona associated with a visualized representation to the instance of the automated assistant. In this example, further assume the system generates the stream of textual content or modified textual content represented by a data structure of <text_stream="Hey there, how are you doing?">, and further assume the system generates the stream of visual cues or modified visual cues represented by data structure of <visual_stream=hand lift_"Hey there"/body gesture> and <visual_stream=smile "how are you doing?"/face gesture>. In this example, the stream of textual content or modified textual content of the stream of visual cues or modified visual cues can be synchronized, resulting in a synchronized data structure of <start=body gesture_hand lift/"Hey there"/end=body gesture_hand lift/start=face gesture_smile/"how are you doing?"/end=face gesture_smile>. Notably, in this example, the stream of visual cues or modified visual cues is annotated with visual cue timestamps that indicate when the stream of visual cues or modified visual cues is to be utilized in controlling the visualized representation of the instance of the automated assistant with respect to the stream of textual content or modified textual content and/or with respect to the synthesized speech audio data that includes the synthesized speech corresponding to the to the stream of textual content or modified textual content.

For instance, the synchronized data structure includes corresponding start visual cue timestamps that indicate when a given visual cue, included in the stream of visual cues, will start being utilized in controlling the visualized representation of the instance of the automated assistant as indicated by the "start=body gesture_hand lift" being defined with respect to a first portion of the textual content (e.g., starting at the same time or within a threshold amount of time of "Hey there" being audibly presented for presentation to the user) and as indicated by the "start=face gesture_smile" being defined with respect to a second portion of the textual content (e.g., starting at the same time or within a threshold amount of time of "how are you doing?" being audibly presented for presentation to the user). Further, the synchronized data structure includes corresponding stop visual cue timestamps that indicate when a given visual cue, included in the stream of visual cues, will stop being utilized in controlling the visualized representation of the instance of the automated assistant as indicated by the "end=body gesture_hand lift" being defined with respect to the first portion of the textual content (e.g., ending at the same time or within a threshold amount of time of "Hey there" being audibly presented for presentation to the user) and as indicated by the "start=face gesture_smile" being defined with respect to a second portion of the textual content (e.g., starting at the same time or within a threshold amount of time of "how are you doing?" being audibly presented for presentation to the user).

Figure 4:
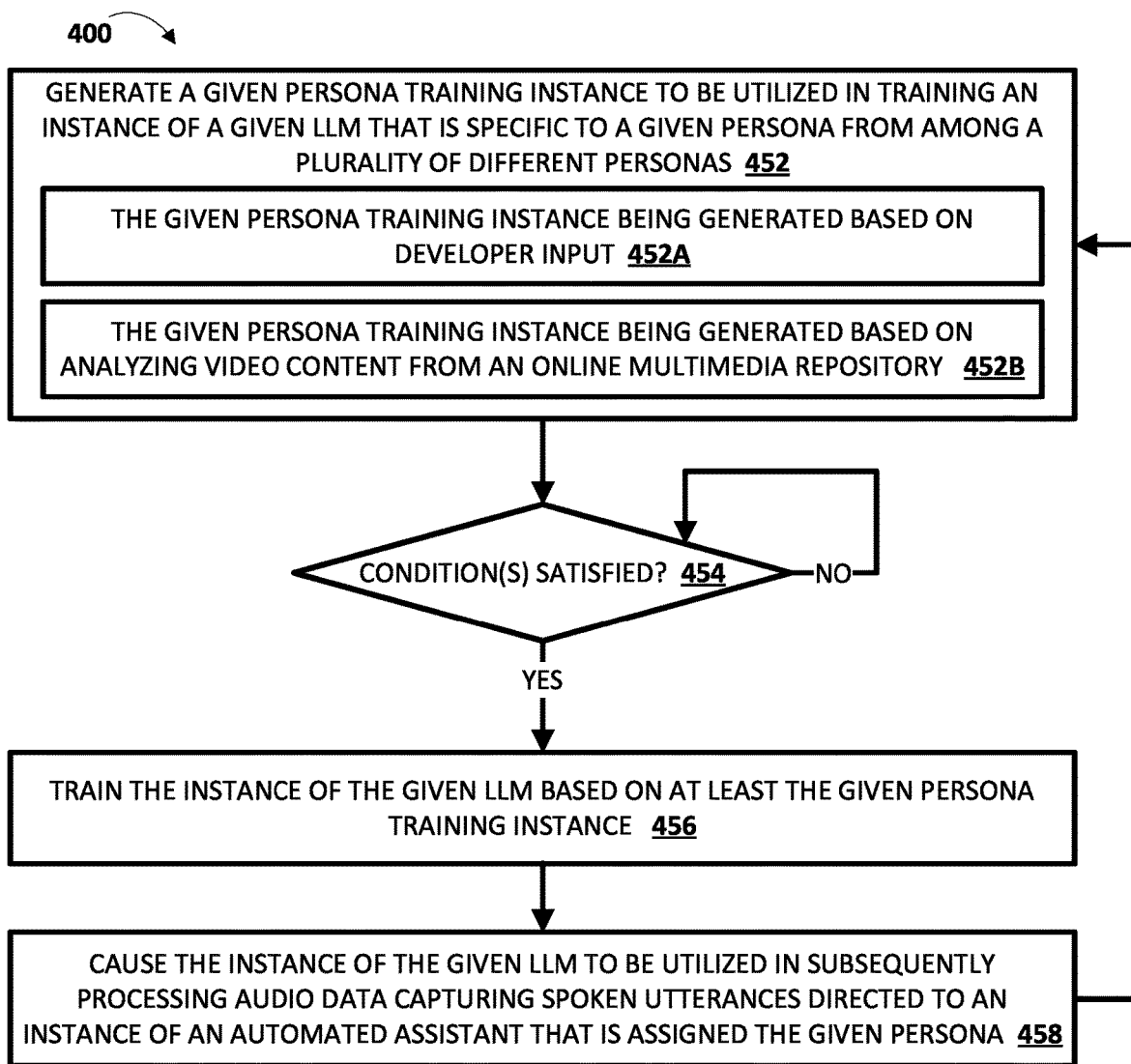
FIG. 4 depicts a flowchart illustrating an example method of training large language models for utilization in dynamically adapting a given assistant output based on a given persona, from among a plurality of disparate personas, assigned to an automated assistant, assigned to the automated assistant, in accordance with various implementations.

In this instance, these timestamps can be automatically annotated for the synchronized data structure by those LLMs (e.g., via the LLM engine 182 of FIG. 1) that are trained in the manner described herein (e.g., with respect to FIGS. 4 and 5) synchronization can be automatically performed by those LLMs (e.g., via the LLM engine 182 of FIG. 1) that are trained in the manner described herein (e.g., with respect to FIGS. 4 and 5). Although the above instance is described with respect to visual cues for controlling the visualized representation of the instance of the automated assistant, it should be understood that is for the sake of example and is not meant to be limiting, and that similar visual cues and one or more corresponding visual cue timestamps can additionally, or alternatively, be utilized in controlling the display of the client device (e.g., as described with respect to FIGS. 6A and 6B). In other instances, these timestamps can be automatically annotated for the synchronized data structure in generating the synthesized speech audio data that includes the synthesized speech corresponding to the to the stream of textual content or modified textual content using the TTS model(s) since tokens corresponding to the stream of textual content or modified and tokens corresponding to the stream of visual cues are available during the TTS generation. This ensures that the stream of visual cues are synchronized with the rendering of the synthesized speech, and not just the underlying stream of textual content or modified textual content included in the synthesized speech.

At block 262, the system determines whether a stream of additional audio data is received. If, at an iteration of block 262, the system determines that a stream of additional audio data has not been received, the system continues monitoring for the stream of additional audio data at block 262. If, at an iteration of block 262, the system determines that a stream of additional audio data has been received, the system returns to block 254 to generate a given additional assistant output based on processing the stream of additional audio data. Notably, the additional stream of audio data may capture an additional spoken utterance from the user or an additional user of the client device (e.g., determined using various techniques described above with respect to the operations of block 252). Accordingly, processing of additional stream of audio data may be adapted in the same or similar manner described above (e.g., assuming the additional spoken utterance was provided by the user that provided the spoken utterance) or other manners (e.g., assuming the additional spoken utterance was provided by the additional user and that the additional user has assigned an additional persona to the instance of the automated assistant).

In various implementations, if, at an iteration of block 262, the system determines that a stream of additional audio data has not been received for a threshold duration of time (e.g., 10 seconds, 30 seconds, 3 minutes, 5 minutes, etc.), then the system may generate a stream of visual cues to be utilized in controlling the visualized representation of the instance of the automated assistant and/or in controlling the display of the client device. This stream of visual cues may be visually rendered to indicate, for example, that the instance of the automated assistant is waiting for the user to provide one or more additional spoken utterances in furtherance of the dialog session, that one or more components of the client device are still active for processing of one or more additional spoken utterances, and/or other information. Notably, this stream of visual cues may optionally be visually rendered independent of any synthesized speech audio data and independent of any spoken utterance to which this stream of visual cues may be considered responsive.

Notably, in the implementations of the method 200 of FIG. 2, the given assistant output may be generated and subsequently adapted to the given persona assigned to the instance of the automated assistant using various post-processing steps. However, it should be understood that is for the sake of example and is not meant to be limiting. For example, and as described below with respect to FIG. 3, the given assistant output may be generated and adapted to the given persona assigned to the instance of the automated assistant without these post-processing steps. Moreover, although implementations of the method 200 of FIG. 2 are described with respect to the user providing spoken utterances, it should be understood that is also for the sake of example and is not meant to be limiting. Rather, it should be understood that implementations of the method 200 of FIG. 2 may also be utilized in response to the user providing typed input and/or touch input.

Turning now to FIG. 3, a flowchart illustrating another example 300 method of dynamically adapting a given assistant output based on a given persona, from among a plurality of disparate personas, assigned to an automated assistant is depicted. For convenience, the operations of the method 300 are described with reference to a system that performs the operations. This system of the method 300 includes one or more processors, memory, and/or other component(s) of computing device(s) (e.g., client device 110 of FIGS. 1, 6A, 6B, 7A, and 7B, persona system 120, and/or computing device 810 of FIG. 8, one or more servers, and/or other computing devices). Moreover, while operations of the method 300 are shown in a particular order, this is not meant to be limiting. One or more operations may be reordered, omitted, and/or added.

At block 352, the system receives a stream of audio data that captures a spoken utterance of a user of a client device, the spoken utterance being directed to an instance of an automated assistant executing at least in part at the client device. The system can receive the stream of spoken audio data in the same or similar manner described above with respect to the operations of block 252 of the method 200 of FIG. 2. Further, the system can optionally process the stream of spoken audio data in the same or similar manner described above with respect to the operations of block 252 of the method 200 of FIG. 2 to identify the user that provided the spoken utterance.

At block 354, the system generates, based on processing the stream of audio data and using a given LLM, a given assistant output that is responsive to the spoken utterance and that is specific to a given persona, from among a plurality of disparate personas, assigned to the instance of the automated assistant by the user, the given assistant output including: (1) a stream of textual content; and (2) a stream of visual cues. In generating the modified given assistant output, the system may also consider a context of a dialog session (if any) in which the spoken utterance is provided by the user. As noted above with respect to the method 200 of FIG. 2, the given persona can include, for example, a given vocabulary that is specific to the given persona and that is utilized in modifying the stream of textual content to generate the stream of modified textual content, a given set of prosodic properties that is specific to the given persona and that is utilized in subsequently synthesizing the stream of modified textual content for audible presentation to the user, and/or a given set of visual cues that is specific to the given persona and that is utilized in modifying the stream of visual cues to generate the stream of modified visual cues. Notably, each of the other disparate personas can also be associated with a corresponding vocabulary, a corresponding set of prosodic properties, and/or a corresponding set of visual cues.

In some implementations, and as indicated at block 354A, the LLM may be specific to the given persona assigned to the instance of the automated assistant. In these implementations, the LLM that is specific to the given persona may be trained in the manner described with respect to FIG. 4. For example, the system can identify the given persona assigned to the instance of the automated assistant, and can obtain the LLM that is specific to the given persona assigned to the instance of the automated assistant from one or more databases (e.g., on-device storage of the client device and/or storage that is remote from the client device but accessible to the client device over one or more networks). Further, the system can process the stream of audio data, using ASR model(s), to generate a stream of ASR output, such as one or more recognized terms corresponding to the spoken utterance captured in the stream of audio data. Moreover, the system can process the stream of ASR output, using NLU model(s), to generate a stream of NLU output, such as one or more intents and corresponding slot value for one or more parameters associated with one or more of the intents. In this example, the system can process the stream of ASR output, the stream of NLU output, and/or a context of a dialog session in which the spoken utterance was provided by the user (if any), using the LLM, to generate the given assistant output. Accordingly, the given assistant output generated at block 354 may be specific to the given persona assigned to the instance of the automated assistant, and without requiring any additional post-processing of the given assistant output to tailor it to the given persona assigned to the instance of the automated assistant, since the LLM utilized in generating the given assistant output was trained specifically for the given persona.

In some implementations, and as indicated at block 354B, the LLM may be general to one or more of the plurality of personas. In these implementations, the system can process the stream of ASR output, the stream of NLU output, and/or a context of a dialog session in which the spoken utterance was provided by the user (if any), using the LLM, to generate the given assistant output as described above. However, in these implementations, the system may also process, using the LLM and along with the stream of ASR output, the stream of NLU output, and/or the context of a dialog session, given persona data that is specific to the given persona assigned to the instance of the automated assistant. The given persona data can correspond to, for example, a given persona token, a given persona embedding, and/or other given persona data that includes a representation of the given persona that is assigned to the instance of the automated assistant. As described herein, the given persona data can be curated by a developer associated with the automated assistant, generated using one or more LLMs, and/or otherwise learned using various techniques. Accordingly, even though the LLM is general to one or more of the plurality of personas, the given assistant output generated at block 354 may be specific to the given persona assigned to the instance of the automated assistant, and without requiring any additional post-processing of the given assistant output to tailor it to the given persona assigned to the instance of the automated assistant, since the processing using the LLM generating the given assistant output is adapted to the given persona through utilization of the given persona data.

At block 356, the system causes synthesized speech audio data capturing synthesized speech corresponding to the stream of textual content or the stream of modified textual content to be audibly rendered for presentation to the user. At block 358, the system causes the stream of visual cues or the stream of modified visual cues to be utilized in controlling a display of the client device and/or in controlling a visualized representation of the instance of the automated assistant. The operations of blocks 356 and 358 may be performed in the same or similar manner described with respect to the operations of block 258 and 260 of the method 200 of FIG. 2, respectively. In various implementations, the system can synchronize, for presentation to the user, the audible rendering of the synthesized speech corresponding to the stream of visual cues or the stream of modified textual context and the utilization of the stream of visual cues or the modified stream of visual cues in controlling the display of the client device and/or for controlling the visualized representation of the instance of the automated assistant (e.g., as described with respect to the method 200 of FIG. 2).

At block 360, the system determines whether a stream of additional audio data is received. If, at an iteration of block 360, the system determines that a stream of additional audio data has not been received, the system continues monitoring for the stream of additional audio data at block 360. If, at an iteration of block 360, the system determines that a stream of additional audio data has been received, the system returns to block 354 to generate a given additional assistant output based on processing the stream of additional audio data. The system can receive the additional stream of audio data and perform subsequent processing thereon and/or monitor for the additional stream of audio data in the same or similar manner described with respect to the operations of block 262 of the method 200 of FIG. 2. Notably, in these implementations and in contrast with implementations of the method 200 of FIG. 2, the given assistant output may be generated for the given persona assigned to the instance of the automated assistant without the various post-processing steps described above with respect to the method 200 of FIG. 2.

Turning now to FIG. 4, a flowchart illustrating an example method 400 of training large language models for utilization in dynamically adapting a given assistant output based on a given persona, from among a plurality of disparate personas, assigned to an automated assistant, assigned to the automated assistant is depicted. For convenience, the operations of the method 400 are described with reference to a system that performs the operations. This system of the method 400 includes one or more processors, memory, and/or other component(s) of computing device(s) (e.g., client device 110 of FIGS. 1, 6A, 6B, 7A, and 7B, persona system 120, and/or computing device 810 of FIG. 8, one or more servers, and/or other computing devices). Moreover, while operations of the method 400 are shown in a particular order, this is not meant to be limiting. One or more operations may be reordered, omitted, and/or added.

At block 452, the system generates a given persona training instance to be utilized in training an instance of a given LLM that is specific to a given persona from among a plurality of different personas. The instance of the given LLM can correspond to, for example, a general LLM that is already trained to generate at least a stream of textual content based on processing corresponding streams of ASR output for various spoken utterances, corresponding streams of NLU data for the various spoken utterances, and/or corresponding contexts of corresponding dialog sessions in which the various spoken utterances are received. However, the instance of the given LLM may not already be trained to generate the stream of textual content that is specific to the given persona and/or may not already be trained to generate a stream of visual cues for the various spoken utterances. Put another way, the instance of the given LLM may already be utilized to generate at least a stream of textual content using a generic large vocabulary, but may not be trained to generate a stream of textual content that is using a given persona large vocabulary that is specific to the given persona and/or may not be trained to generate a stream of visual cues for controlling a display of a client device at which an instance of an automated assistant that is assigned the given persona is executing and/or for controlling a visualized representation of the instance of the automated assistant. Accordingly, the given persona training instances described in the manner herein is one technique for enabling the instance of the given LLM to generate the stream of textual content that is specific to the given persona and the stream of visual cues that is specific to the given persona.

In some implementations, and as indicated at block 452A, the given persona training instance may be generated based on developer input (e.g., as described with respect to the methods 500A and 500B of FIG. 5). In additional or alternative implementations, and as indicated at block 452B, the given persona training instance may be generated based on analyzing video content from an online multimedia repository (e.g., as described with respect to the method 500C of FIG. 5). In other implementations, the given persona training instances may be obtained from one or more databases, such as implementations where the given persona training instances are generated by one or more of the 3P systems 192 of FIG. 1.

At block 454, the system determines whether one or more conditions for training the instance of the given LLM are satisfied. The one or more conditions for training the instance of the given LLM a quantity of training instances available for training the instance of the given LLM, a time of day, a day of week, a duration of time that has elapsed since the instance of the given LLM was previously trained via an instance of the method 400 of FIG. 4, whether developer input has been received to train the instance of the given LLM, and/or other conditions. If, at an iteration of block 454, the system determines the one or more conditions for training the given LLM are not satisfied, the system may continue monitoring for satisfaction of the one or more conditions at block 454. Notably, while the system continues to monitor for satisfaction of the one or more conditions at block 454, the system may continue generating additional given persona training instances to be utilized in training the instance of the given LLM that is specific to the given persona. If, at an iteration of block 454, the system determines the one or more conditions for training the given LLM are satisfied, the system may proceed to block 456.

At block 456, the system trains the instance of the given LLM to be utilized in subsequently processing audio data capturing spoken utterances directed to an instance of an automated assistant that is assigned the given persona. The system may adapt how the instance of the given LLM is trained based on how the given persona training instance is generated as described with respect to the methods 500A, 500B, and 500C of FIG. 5. At block 458, the system causes the instance of the given LLM to be utilized in subsequently processing audio data capturing spoken utterances directed to an instance of an automated assistant that is assigned the given persona (e.g., as described with respect to the methods 300 and 400 of FIGS. 3 and 4, respectively).

Notably, the system may return to the operations of blocks 452 to generate additional given persona training instances that are specific to the given persona to be utilized in further training the given instance of the given LLM that is specific to the given persona. The system may continue to refine the instance of the given LLM based on the additional given persona training instances. Moreover, the system may perform additional iterations of the method 400 of FIG. 4, in a parallel manner or in a serial manner, to train additional instances of the given LLM that are specific to other corresponding personas that are assignable to the instance of the automated assistant. Put another way, multiple iterations of the method 400 of FIG. 4 may be utilized to generate corresponding instances of the given LLM that are specific to multiple different personas that are assignable to the instance of the automated assistant.

Turning now to FIG. 5, flowcharts illustrating example methods 500A, 500B, and 500C of generating persona training instances for utilization in training large language models that are utilized in dynamically adapting a given assistant output based on a given persona, from among a plurality of disparate personas, assigned to an automated assistant, assigned to the automated assistant are depicted. For convenience, the operations of the methods 500A, 500B, and 500C are described with reference to a system that performs the operations. This system of the methods 500A, 500B, and 500C includes one or more processors, memory, and/or other component(s) of computing device(s) (e.g., client device 110 of FIGS. 1, 6A, 6B, 7A, and 7B, persona system 120, and/or computing device 810 of FIG. 8, one or more servers, and/or other computing devices). Moreover, while operations of the methods 500A, 500B, and 500C are shown in a particular order, this is not meant to be limiting. One or more operations may be reordered, omitted, and/or added. Further, it should be understood that each of the methods 500A, 500B, and 500C provide additional, or alternative, techniques that may be implemented at one or more iterations of the operations of block 452 of the method 400 of FIG. 4.

In some implementations, at block 552, the system receives, from a developer associated with the automated assistant and for the given persona, developer input that annotates the stream of textual content with one or more visual cue timestamps that indicate when a stream of visual cues is to be utilized with respect to a stream of textual content. For example, assume the stream of textual content is represented by a data structure of <text_stream="Hey there, how are you doing?". In this example, the developer input can associate associated one or more visual cues with one or more portions of the stream of textual content, such as providing developer input that includes visual cues represented by data structured of <visual_stream=hand lift_"Hey there"/body gesture> to cause a visualized representation of an instance of an automated assistant to wave while the "Hey there" portion of the stream of textual content is being audibly presented and <visual_stream=smile "how are you doing?"/face gesture> to cause the visualized representation of the instance of an automated assistant to smile while the "how are you doing" portion of the stream of textual content is being audibly presented. Further, in this example or other examples where the one or more visual cues are already associated with the stream of textual content, the developer input may include the one or more visual cue timestamps that indicate when the stream of visual cues is to be utilized with respect to the stream of textual content, such as by defining when the visual cues, included in stream of visual cues, should start being utilized, should be paused, should end being utilized, and/or other indications of how they are to be utilized. Put another way, the developer input can be provided to synchronize utilization of the stream of visual cues with respect to the stream of textual content, such as represented by the synchronized data structure of <start=body gesture_hand lift/"Hey there"/end=body gesture_hand lift/start=face gesture_smile/"how are you doing?"/end=face gesture_smile> described above with respect to the method 200 of FIG. 2.

In these implementations, at block 554, the system generates, based on at least the developer input, the given persona training instance. In some versions of these implementations, the given persona training instance can include, for example, training instance input and training instance output. Continuing with the above example, the training instance input can include, for example, a stream of ASR output for one or more corresponding spoken utterances that may result in the stream of textual segment, a stream NLU output generated based on the stream of ASR output, and/or one or more corresponding contexts of corresponding dialogs in which the one or more corresponding spoken utterances were received. The training instance output can include, for example, the stream of textual content and the stream of visual cues defined with respect to the stream of textual content (e.g., via the one or more visual cue timestamps). In these implementations, in training the instance of the given LLM based on the given persona training instance generated in the manner described with respect to the operations of block 554, the system can cause the instance of the given LLM to process the training instance input to generate predicted output. The predicted output can include, for example, a predicted stream of textual content and a predicted stream of visual cues defined with respect to the predicted stream of textual content. In this example, the system can compare the predicted stream of visual cues defined with respect to the predicted stream of textual content with the stream of visual cues defined with respect to the stream of textual content of the training instance output that is determined based on the developer input to generate one or more losses, and the instance of the given LLM may be updated based on one or more of the losses (e.g., via backpropagation). In this example, the system can additionally or alternatively compare the predicted stream of textual content with the stream of textual content of the training instance output that was annotated by the developer to generate one or more additional, or alternative, losses, and the instance of the given LLM may be updated based on one or more of the additional, or alternative, losses (e.g., via backpropagation). Put another way, the system can cause the instance of the given LLM to be trained to generate the stream of textual content and the stream of visual cues that are specific to the given persona and that are defined with respect to the visual cues.

In additional or alternative versions of these implementations, the given persona training instance can include, for example, a mapping between the stream of textual content and the stream of visual cues (and/or the one or more visual cue timestamps). In these implementations, in training the instance of the given LLM based on the given persona training instance generated in the manner described with respect to the operations of block 554, the system can assign the mapping to the stream of textual content such that, when the instance of the given LLM subsequently generates the stream of textual content based on subsequent spoken utterances, the stream of visual cues and the one or more stream of visual cue timestamps can be obtained and utilized in controlling the display of the client device and/or the visualized representation assigned to the instance of the automated assistant for the given persona. Put another way, the system can cause the instance of the given LLM to be trained to generate the stream of textual content and to obtain the stream of visual cues and the one or more visual cue timestamps that are specific to the given persona and that are defined with respect to the visual cues.

In additional or alternative implementations, at block 556, the system receives, from a developer associated with the automated assistant and for the given persona, developer input that modifies a screen animation as a stream of visual cues with respect to a stream of textual content. For example, again assume the stream of textual content is represented by a data structure of <text_stream="Hey there, how are you doing?". In this example, and in contrast with the operations of block 552 described above, the developer input can define higher level animated physical motion gestures (e.g., higher level at least with respect to the data structures described above with respect to the operations of block 552) to be utilized in controlling the visualized representative of the instance of the automated assistant with respect to the stream of textual content and/or higher level screen animations to be utilized in controlling the display of the client device. For instance, the developer input can be provided via a dedicated training platform that enables the developer to modify or move animated body parts of the visualized representation of the instance of the automated assistant with respect to the stream of textual content via one or more input devices (e.g., a mouse and keyboard) and/or modify or add screen animations for utilization in controlling the display of the client device. As some non-limiting example, the developer input can include dragging an arm of the visualized representation to move in a waving motion, providing input of "wave" to cause the arm of the visualized representation to move in a waving motion, providing input of "jump" to cause the visualized representation to move in a jumping motion, dragging one or more portions of a face of the visualized representation to cause it to smile, frown, etc., providing input of "smile" to cause the arm of the visualized representation to smile, and/or any other type of developer input via the dedicated training platform. Notably, in these implementations, the developer input may not need to explicitly annotate the stream of textual content with the one or more visual cue timestamps.

In these implementations, at block 558, the system generates, based on at least the developer input, the given persona training instance. In some versions of these implementations, the given persona training instance can include, for example, training instance input and training instance output as described above (e.g., with respect to the operations of block 554). However, in these implementations, the stream of visual cues and/or the one or more visual cue timestamps may be derived from the developer input by translating the higher level animated physical motion gestures and/or screen animations into the different structures described above to enable the instance of the given LLM to be trained in the same or similar manner described above with respect to the processing of the given persona training instance at the operations of block 554. In additional or alternative versions of these implementations, the given persona training instance can include, for example, a mapping between the stream of textual content and the higher level animated physical motion gestures and/or screen animations. In these implementations, in training the instance of the given LLM based on the given persona training instance generated in the manner described with respect to the operations of block 558, the system can assign the mapping to the stream of textual content such that, when the instance of the given LLM subsequently generates the stream of textual content based on subsequent spoken utterances, the higher level animated physical motion gestures and/or screen animations can be obtained and utilized in controlling the display of the client device and/or the visualized representation assigned to the instance of the automated assistant for the given persona.

In additional or alternative implementations, at block 560, the system obtains, from an online multimedia repository, video content that includes a stream of audio data for audible content of the video and a stream of vision data for visual content of the video. The online multimedia repository may be hosted by one parties described herein, such as one or more of the 1P systems 191 and/or 3P systems 192 of FIG. 1. For example, the online multimedia repository may be a public online multimedia repository that enables a plurality of users to upload and share the video content with other users. Also, for example, the online multimedia repository may be a private online multimedia repository that is only accessible to certain users. The video content can capture, for example, one or more persons or characters which are to be emulated by the virtualized representation of the automated assistant that is associated with the given persona.

In these implementations, at block 562, the system processes the stream of audio data to generate a stream of textual content and the stream of vision data to generate a stream of visual cues. For example, the system can process the stream of audio data included in the video content, using ASR model(s), to generate a stream of ASR output, and can process the stream of ASR output, using NLU model(s), to generate a stream of NLU output. The stream of textual content can be determined based on at least the stream of ASR output and/or the stream of NLU output as described herein (e.g., with respect to the method 200 of FIG. 2, the method 300 of FIG. 3, etc.). In this example, the system can also process the stream of vision data, using one or more movement tracking machine learning models (e.g., machine learning model(s) trained to track eye gaze, mouth movement, lip movement, body movement, body posture, etc.), to generate output indicative of how the person or character captured in the video content visually expresses themselves as they speak. In some versions of these implementations, the stream of visual cues can correspond to the output generated using the one or more movement tracking machine learning models. In additional or alternative implementations, the output generated using the one or more movement tracking machine learning models can be further processed (e.g., using one or more classification machine learning models) to determine the higher level animated physical motion gestures and/or screen animations. Notably, the audible content and the visual content of the video content are already synchronized when they are initially processed by virtue of both being part of the video content. Accordingly, one or more video timestamps associated with both the audible content and the visual content of the video content can be utilized in assigning the one or more visual cue timestamps that indicate when the stream of visual cues are to be utilized with respect to the stream of textual content.

In these implementations, at block 564, the system generates, based on at least the stream of textual content and the stream of visual cues, the given persona training instance. In some versions of these implementations, the given persona training instance can include, for example, training instance input and training instance output and be utilized to train the instance of the given LLM for the given persona as described above (e.g., with respect to the operations of block 554).

Notably, these various methods 500A, 500B, and 500C provide different techniques for generating persona training instances. For instance, the method 500A of FIG. 5 describes a process that manually defines the given persona training instance, via the developer input, in that the developer input defines the stream of visual cues and/or the one or more visual cue timestamps with respect to the stream of textual content. Also, for instance, the method 500B of FIG. 5 describes a process that semi-manually defines the given persona training instance, via the developer input, in that the developer input defines the stream of visual cues and/or the one or more visual cue timestamps at a higher level with respect to the stream of textual content that enables the given persona training instance to be generated. Also, for instance, the method 500C of FIG. 5 describes a process that automatically defines the given persona training instance, via the processing of the video content, in that no developer input is utilized in generating the given persona training instance. Each of these different methods may be utilized alone, or in any combination, to generate the given persona training instance and/or additional given persona training instances to be utilized in training the instance of the given LLM that is specific to the given persona. For instance, the methods 500A and 500B may be utilized to generate given persona training instance for initially bootstrapping the instance of the given LLM, but the method 500C may be utilized to further train and refine the instance of the given LLM to reduce time and costs associated with generating the given persona training instances. Alternatively, the method 500C may be utilized for initially bootstrapping the instance of the given LLM to reduce time and costs associated with generating the given persona training instances, but the methods 500A and 500B may be utilized to further train and refine the instance of the given LLM to ensure higher accuracy and precision in subsequent use of the instance of the given LLM.

Although the methods 500A, 500B, and 500C of FIG. 5 describe particular techniques for generating the given persona training instance, it should be understood that these particular techniques are provided for the sake of example and are not meant to be limiting. Further, although the methods 500A, 500B, and 500C are generally described with respect to generating the given persona training instance for utilization in training the instance of the given LLM, it should be understood that is also for the sake of example and is not meant to be limiting. For instance, the methods 500A, 500B, and/or 500C can also be utilized to generate additional given persona training instances for utilization in training the instance of the given LLM that is specific to the given persona that is assignable to the instance of the automated assistant. Additionally, or alternatively, the methods 500A, 500B, and/or 500C can also be utilized to generate given additional persona training instance for utilization in training an additional instance of the given LLM that is specific to a given additional persona that is also assignable to the instance of the automated assistant.

Figure 6A:
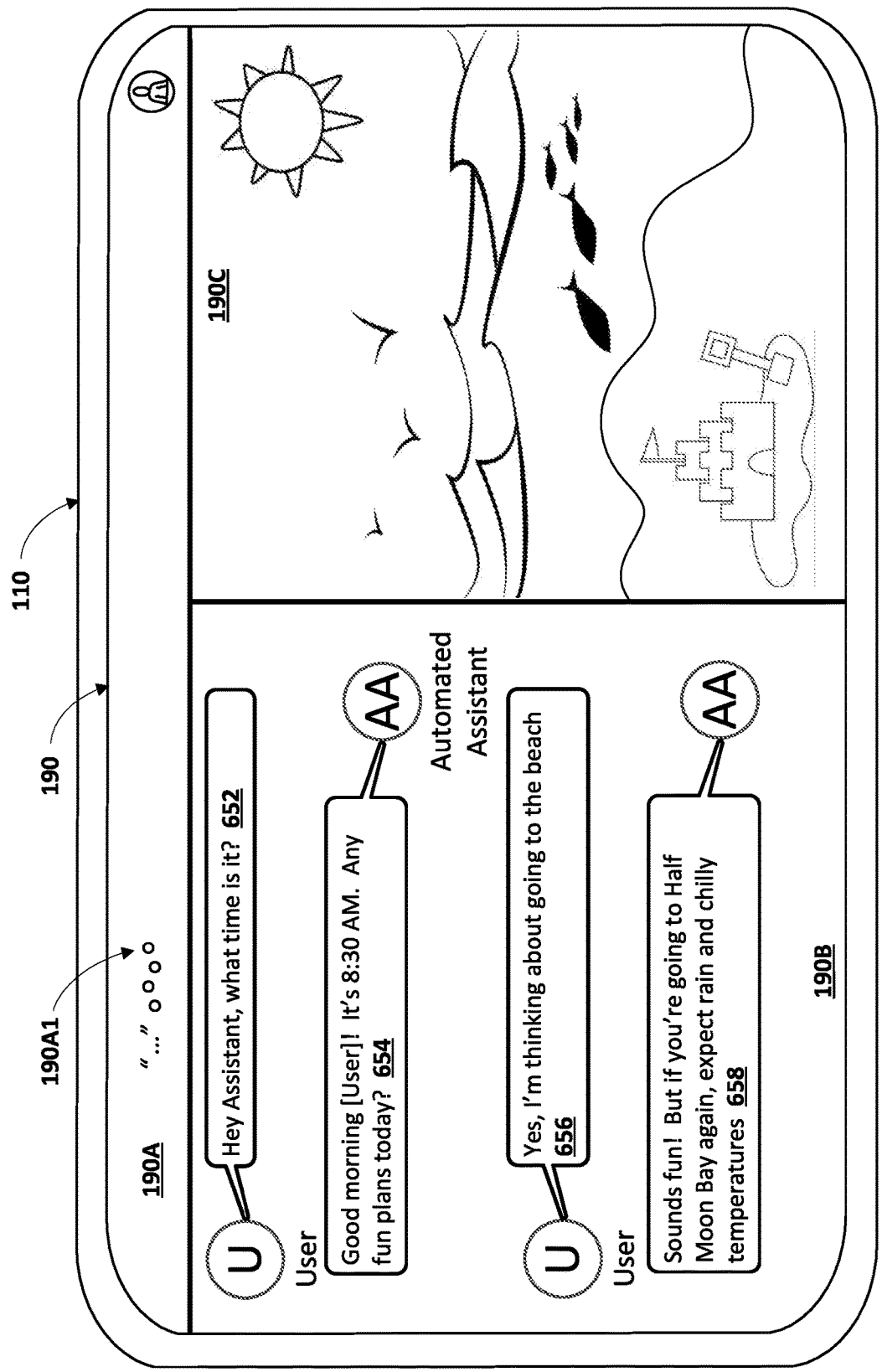
FIGS. 6A and 6B illustrate non-limiting examples of dynamically adapting a display of a client device, at which an automated assistant is implemented, based on a given persona, from among a plurality of disparate personas, assigned to the automated assistant, in accordance with various implementations.
Figure 6B:
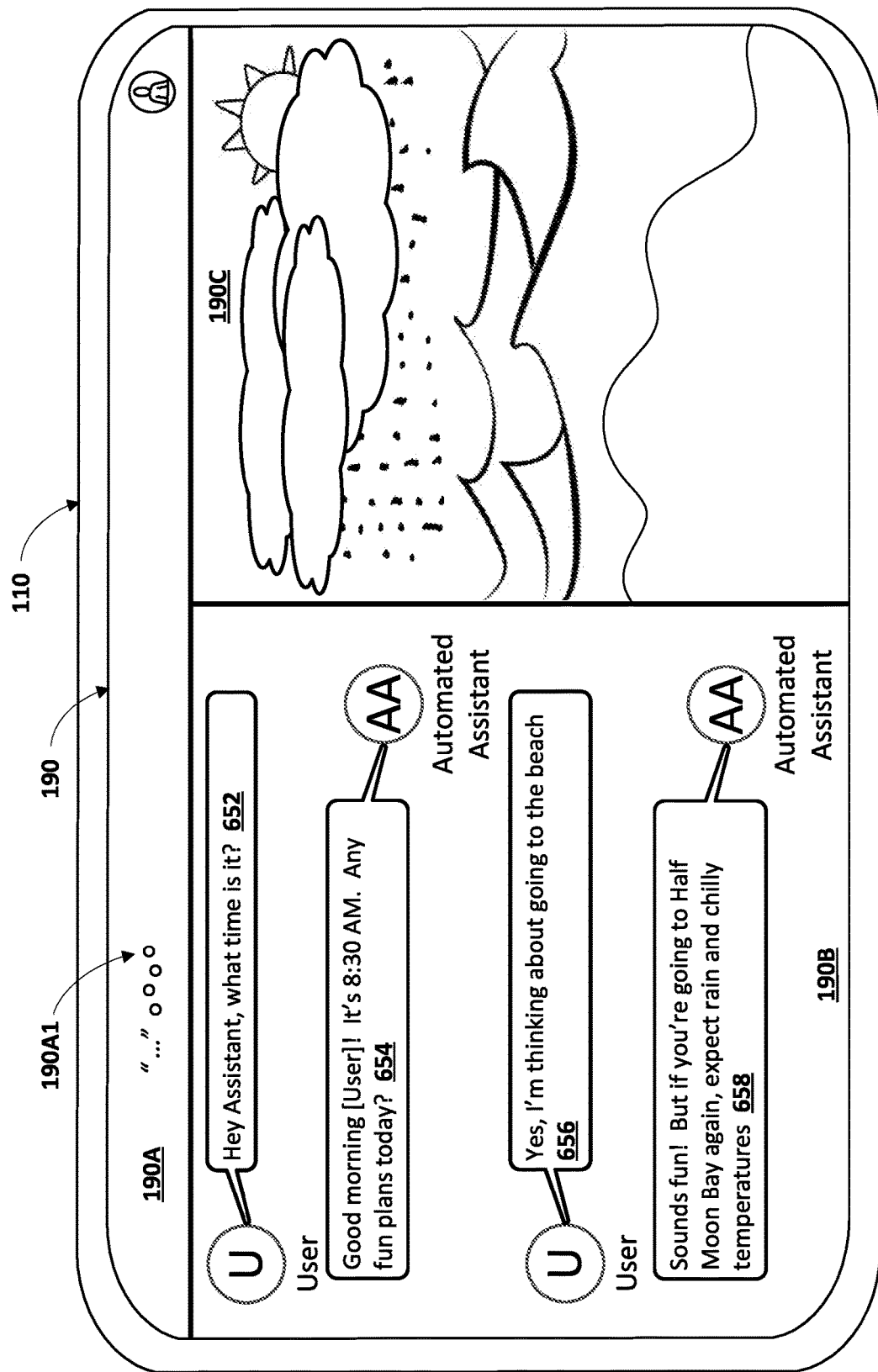

Turning now to FIGS. 6A and 6B, various non-limiting examples of dynamically adapting a display of a client device, at which an automated assistant is implemented, based on a given persona, from among a plurality of disparate personas, assigned to the automated assistant are depicted. For the sake of example, assume the client device depicted in FIGS. 6A and 6B is an instance of the client device 110 of FIG. 1, and that the client device 110 includes a display 190. The display 190 may be, for example, a touchscreen screen display that includes various portions. For example, the display 190 may include a first portion 190A that includes an indication a user account that is active at the client device 110 (e.g., as indicated by a user account symbol in the right-hand side of the first portion 190A of the display 190), and an indication of when various components are active at the client device 110, such as one or more microphones or speech processing components of the client device 110 (e.g., as indicated by the ellipses 190A1 in the first portion 190A of the display 190). Further, the display 190 may include a second portion 190B that includes a transcription of a dialog between a user of the client device 110 and an instance of the automated assistant that is implemented at least in part at the client device 110. Further, the display may include a third portion 190C that includes a space for visual content to be provided for visual presentation to the user (e.g., a home screen).

Although the display 190 shown in FIGS. 6A and 6B includes various disparate portions, it should be understood that is for the sake of illustration and is not meant to be limiting. For instance, the disparate portions of the display may overlay one another (e.g., the second portion 190B of the display 190 overlaying the third portion 190C of the display 190) and/or be omitted in certain circumstances (e.g., the second portion 190B of the display 190 may be omitted when the user is not engaged in a dialog session with the instance of the automated assistant). Further, although the client device 110 is depicted in FIGS. 6A and 6B, it should also be understood that is for the sake of example and is not meant to be limiting, and that additional, or alternative, client devices having displays may implement the techniques described herein. Moreover, although the examples described with respect to FIGS. 6A and 6B illustrate particular examples, it should be understood that is also for the sake of example and is not meant to be limiting, and that the techniques described herein can be utilized in controlling the display of the client device 110 in various other dialog sessions related to various disparate topics.

For the sake of example in describing FIGS. 6A and 6B, assume that the user provides a spoken utterance 652 of "Hey Assistant, what time is it?", assume that the instance of the automated assistant processes a stream of audio data (e.g., generated by one or more microphones of the client device 110) capturing the spoken utterance 652 to cause synthesized speech 654 of "Good morning [User]! It's 8:30 AM. Any fun plans today?" to be audibly rendered for presentation to the user via one or more speakers of the client device 110 and responsive to the spoken utterance 652, assume that the user provides an additional spoken utterance 656 of "Yes, I'm thinking about going to the beach" responsive to the synthesized speech 654, and assume that the instance of the automated assistant processes the stream of audio data capturing the spoken utterance 656 to cause synthesized speech 658 of "Sounds fun! But if you're going to Half Moon Bay again, expect rain and chilly temperatures" to be audibly rendered for presentation to the user via one or more speakers of the client device 110 and responsive to the spoken utterance 656. In this example, the instance of the automated assistant may process the corresponding spoken utterances captured in the corresponding streams of audio data to generate corresponding stream of textual segments in any manner described herein (e.g., with respect to the method 200 of FIG. 2 and/or the method 300 of FIG. 3), and optionally utilizing one or more LLMs that are trained in any manner described herein (e.g., with respect to the method 400 of FIG. 5 and/or the methods 500A, 500B, and/or 500C of FIG. 5). In some implementations, the instance of the automated assistant may cause a transcription capturing this dialog session to be provided for visual presentation to the user at the display 190 of the client device 110 (e.g., as shown in the second portion 190B of the display 190 in FIGS. 6A and 6B).

In this example, and in processing the stream of audio data (e.g., generated by one or more microphones of the client device 110) capturing the spoken utterance 656, the instance of the automated assistant can utilize a stream of visual cues to control the display 190 of the client device 110. For instance, and as shown in FIG. 6A, the stream of visual cues utilized in controlling the display 190 of the client device 110 that is generated in processing the stream of audio data capturing the spoken utterance 656 may cause the display 190 of the client device to visually present a beach scene for presentation to the user at the display 190 of the client device 110 (e.g., as shown in the third portion 190C of the display 190 in FIG. 6A) since the spoken utterance 656 indicated that the user plans on going to the beach. The beach scene shown in FIG. 6A can include, for instance, a sandy beach with a sand castle, an ocean with waves and fish swimming through the water, a bright sunny sky with birds flying through the air, and/or other content that users may typically associate with a beach. Notably, the instance of the automated assistant may utilize the stream of visual cues to control the display 190 of the client device 110 to visually present the beach scene with respect to a stream of textual content captured in the synthesized speech 658, such as the stream of textual content of "Sounds fun! But if you're going to Half Moon Bay again, expect rain and chilly temperatures" that is synthesized to generate the synthesized speech 658. In this example, the stream of textual content utilized in generating the synthesized speech 658 and the stream of visual cues utilized in controlling the display 190 of the client device 110 form a given assistant output that is responsive to the spoken utterance 656.

The stream of visual cues in the instance of FIG. 6A can include, for example, an indication of visual content to be presented, an indication of how the visual content should be presented and/or arranged, one or more visual cue timestamps for the visual content should be presented with respect to the stream of textual content that is captured in the synthesized speech 658, and/or other information for instructing the instance of the automated assistant what to display, how to display it, and when to display it. In some implementations, the visual content provided for visual presentation to the user according to the stream of visual cues may be static visual content. For instance, the waves, the fish, and the birds may not move once displayed unless otherwise indicated by the stream of visual cues. In other implementations, the visual content provided for visual presentation to the user according to the stream of visual cues may be dynamic visual content. For instance, the waves may appear as if they are moving and breaking onto the sandy beach, the fish may appear as if they are swimming through the ocean, and the birds may appear as if they are flying through the sky as indicated by the stream of visual cues.

In the instance shown in FIG. 6A, the instance of the automated assistant can use, for example, one or more visual cue timestamps to cause the beach scene to be visually provided for presentation to the user via the display 190, such as an instance of time immediately before the synthesized speech 658 is audibly presented and/or an instance of time when the synthesized speech 658 is initially being audibly presented. However, as the synthesized speech 658 is initially being audibly presented, the instance of the automated assistant can utilize the stream of visual cues to cause the display 190 of the client device 190 to adapt the beach scene to be more contextually relevant to the dialog session between the user and the instance of the automated assistant.

Notably, the synthesized speech 658 indicates that there will be rain and chilly temperatures at Half Moon Bay—a fictitious beach that the user typically visits when going to the beach. This weather information can be obtained based on the instance of the automated assistant submitting a query for the weather information based on the spoken utterance 656 indicating that the user is going to the beach. Accordingly, the synthesized speech 658 may also be contextually relevant to the dialog session between the user and the instance of the automated assistant. However, the beach scene depicted in FIG. 6A may not accurately reflect the weather information. As a result, and as shown in FIG. 6B, the stream of visual cues utilized in controlling the display 190 of the client device 110 that is generated in processing the stream of audio data capturing the spoken utterance 656 may cause the display 190 of the client device to visually adapt the beach scene for presentation to the user at the display 190 of the client device 110 (e.g., as shown in the third portion 190C of the display 190 in FIG. 6B) since the weather information indicates that there will be rain and chilly temperatures. The beach scene shown in FIG. 6B can include, for instance, the sandy beach with the sand castle can transition to remove the sand castle since people do not typically build sand castles in the rain, the waves in the ocean can grow larger than those shown in FIG. 6B and the fish swimming through the water may disappear to reflect larger swells and turbulent water associated with rain, the bright sunny sky with birds flying through the air can transition to a cloudy sky that is spitting rain, and/or other content that users may typically associate with a rainy beach. Notably, the instance of the automated assistant may utilize the stream of visual cues to control the display 190 of the client device 110 to visually present the beach scene with respect to a stream of textual content captured in the synthesized speech 658, such as the stream of textual content of "Sounds fun! But if you're going to Half Moon Bay again, expect rain and chilly temperatures" that is synthesized to generate the synthesized speech 658.

Similar to the example of FIG. 6A, in the example of FIG. 6B, the instance of the automated assistant can use, for example, the one or more visual cue timestamps to cause the beach scene to be adapted for presentation to the user via the display 190, such as an instance of time when the "But" portion of the synthesized speech 658 is being audibly presented and/or an instance of time when the "expect rain and chilly temperatures" portion of the synthesized speech 658 is being audibly presented. Thus, as the synthesized speech 658 is being audibly presented, the instance of the automated assistant can utilize the stream of visual cues to cause the display 190 of the client device 190 to be controlled to initially present the sunny beach scene shown in FIG. 6A, but dynamically adapts the sunny beach scene to the rainy beach scene shown in FIG. 6B be more contextually relevant throughout the dialog session between the user and the instance of the automated assistant.

Although FIGS. 6A and 6B are described above with respect to a particular stream of visual cues that is utilized in controlling the display 190 of the client device 110, it should be understood that is for the sake of example and is not meant to be limiting. Rather, it should be understood that the example of FIGS. 6A and 6B are provided to illustrate how the instance of the automated assistant can utilize the stream of visual cues, in addition to a particular stream of textual content (e.g., captured in the synthesized speech 658), in responding to the spoken utterance 656. Also, for instance, the stream of visual cues can additionally, or alternatively, be utilized in controlling a visualized representation of the instance of the automated assistant (e.g., as described below with respect to FIGS. 7A and 7B). Further, although the particular stream of visual cues that is utilized in controlling the display 190 of the client device 110 only responsive to the spoken utterance 656, it should be understood that is for the sake of brevity and is not meant to be limiting. For instance, an additional particular stream of visual cues may be generated and utilized with respect to an additional stream of textual content (e.g., captured in the synthesized speech 654) to dynamically present visual content associated with a clock that reflects a current time (e.g., 8:30 AM as indicated by the synthesized speech 654). Moreover, although FIGS. 6A and 6B are not described with respect to the instance of the automated assistant without any specific persona, it should be understood that is for the sake of example and is not meant to be limiting. Rather, it should be understood that a vocabulary utilized in generating the streams of textual content may be biased towards a given persona vocabulary of a given persona assigned to the instance of the automated assistant and that a set of prosodic properties utilized in generating the synthesized speech may be specific to the given persona assigned to the instance of the automated assistant (e.g., as described in more detail with respect to FIGS. 7A and 7B). Furthermore, although FIGS. 6A and 6B are described with respect to the user providing spoken utterances as input, it should be understood that is for the sake of example and is not meant to be limiting. Rather, it should be understood that techniques of FIGS. 6A and 6B may also be employed in instances where the user provides typed input and/or a mix of typed input and spoken utterances.

Figure 7A:
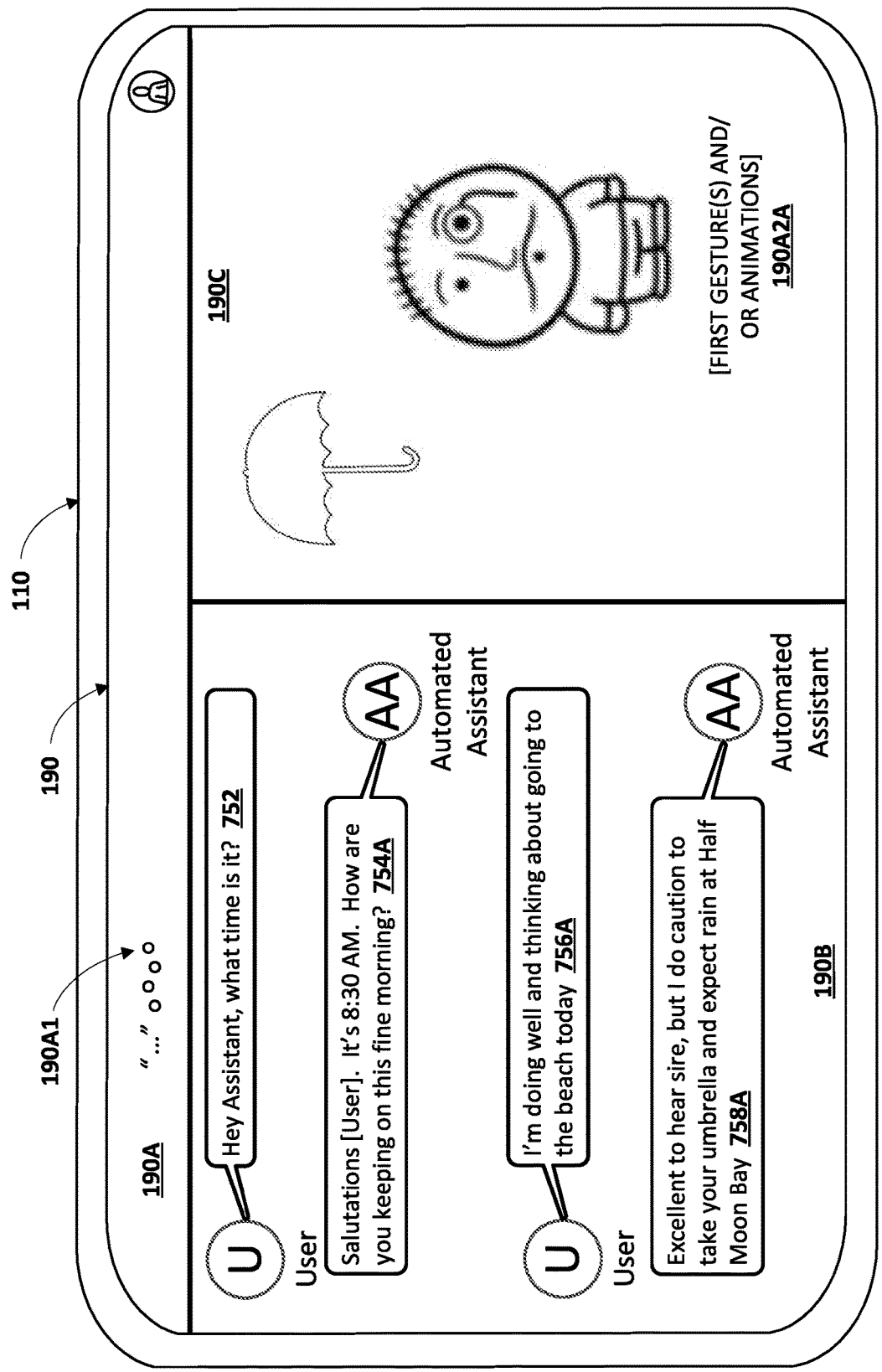
FIGS. 7A and 7B illustrate non-limiting examples of dynamically adapting a visualized representation of an automated assistant based on a given persona, from among a plurality of disparate personas, assigned to the automated assistant, in accordance with various implementations.
Figure 7B:
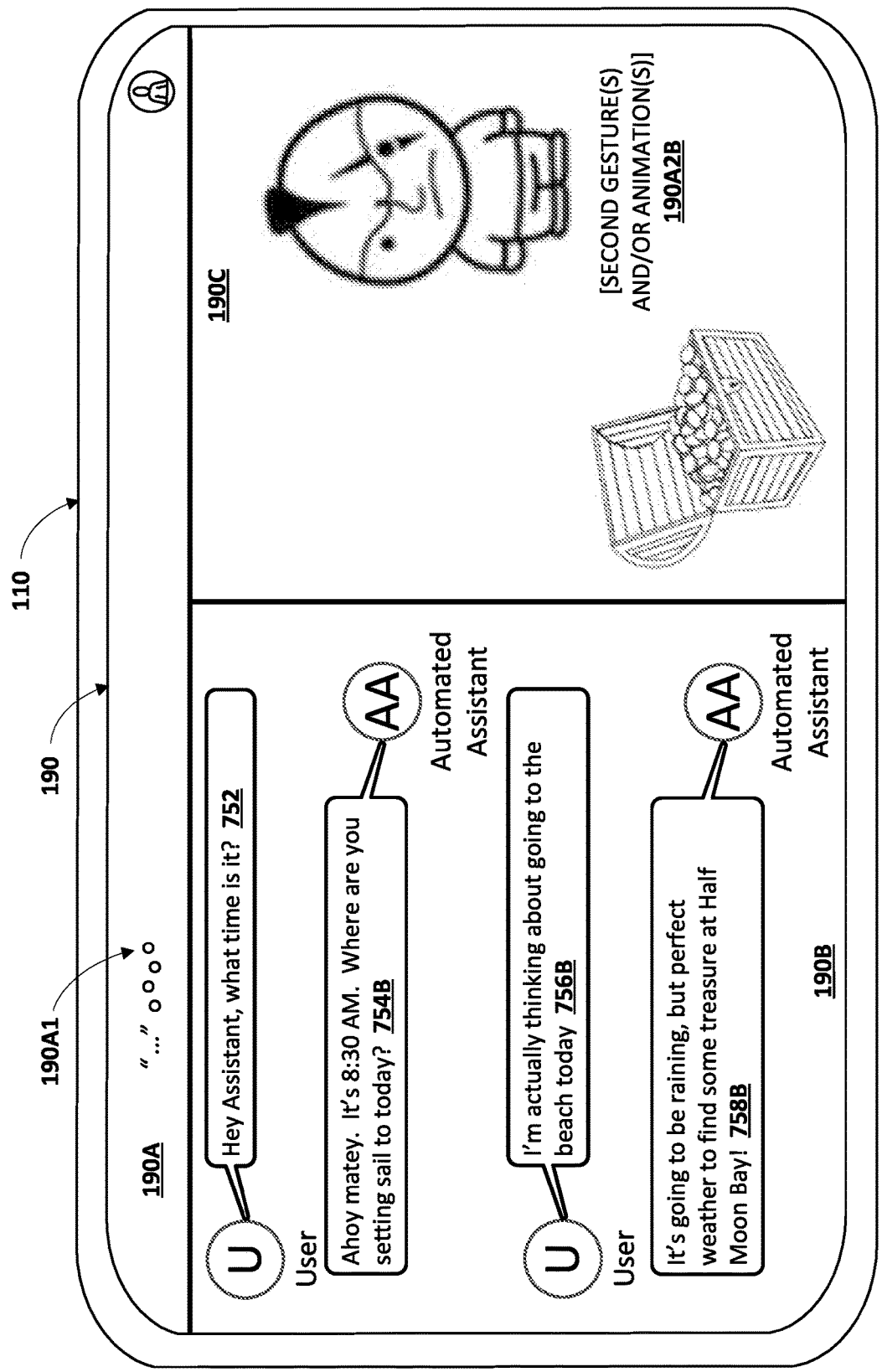

Turning now to FIGS. 7A and 7B, various non-limiting examples of dynamically adapting a visualized representation of an automated assistant based on a given persona, from among a plurality of disparate personas, assigned to the automated assistant are depicted. For the sake of brevity, the client device depicted in FIGS. 7A and 7B is the same client device described above with respect to FIGS. 6A and 6B. For the sake of example in describing FIG. 7A, assume that a user of the client device 110 has assigned a butler persona to an instance of the automated assistant. For the sake of example in describing FIG. 7B, assume that the user of the client device 110 has assigned a pirate persona to the instance of the automated assistant. As described herein, these different personas assigned to the automated assistant may influence a vocabulary utilized by the instance of the automated assistant in generating streams of textual segments during a dialog session between the user and the instance of the automated assistant, a set of prosodic properties utilized by the instance of the automated assistant in generating corresponding synthesized speech that captures the streams of textual segments during the dialog session between the user and the instance of the automated assistant, and/or a set of visual cues utilized by the instance of the automated assistant in generating streams of visual cues during the dialog session between the user and the instance of the automated assistant.

Referring specifically to FIG. 7A (e.g., where the butler persona is assigned to the automated assistant), assume that the user of the client device 110 provides a spoken utterance

752 of "Hey Assistant, what time is it?", assume that the instance of the automated assistant processes a stream of audio data (e.g., generated by one or more microphones of the client device 110) capturing the spoken utterance 752 to cause synthesized speech 754A of "Salutations [User]! It's 8:30 AM. How are you keeping on this fine morning?" to be audibly rendered for presentation to the user via one or more speakers of the client device 110 and responsive to the spoken utterance 752, assume that the user provides an additional spoken utterance 756A of "I'm doing well and thinking about going to the beach" responsive to the synthesized speech 754A, and assume that the instance of the automated assistant processes the stream of audio data capturing the spoken utterance 756A to cause synthesized speech 758A of "Excellent to hear sire, but I do caution you to take your umbrella and expect rain at Half Moon Bay" to be audibly rendered for presentation to the user via one or more speakers of the client device 110 and responsive to the spoken utterance 756A.

Referring specifically to FIG. 7B (e.g., where the pirate persona is assigned to the automated assistant), assume that the user of the client device 110 provides the spoken utterance 752 of "Hey Assistant, what time is it?", assume that the instance of the automated assistant processes a stream of audio data (e.g., generated by one or more microphones of the client device 110) capturing the spoken utterance 752 to cause synthesized speech 754B of "Good morning matey! It's 8:30 AM. Where are you setting sail to today?" to be audibly rendered for presentation to the user via one or more speakers of the client device 110 and responsive to the spoken utterance 752, assume that the user provides an additional spoken utterance 756B of "I'm actually thinking about going to the beach today" responsive to the synthesized speech 754B, and assume that the instance of the automated assistant processes the stream of audio data capturing the spoken utterance 756B to cause synthesized speech 758B of "It's going to be raining, but perfect weather to find some treasure at Half Moon Bay!" to be audibly rendered for presentation to the user via one or more speakers of the client device 110 and responsive to the spoken utterance 756B.

Accordingly, in these examples, and even though the spoken utterances provided by the user of the client device 110 are generally the same in FIGS. 7A and 7B, corresponding streams of textual segments utilized in generating the synthesized speech in FIGS. 7A and 7B differ, and corresponding stream of visual cues utilized in controlling corresponding visualized representations of the different personas differ (e.g., as indicated by first gesture(s) and/or animation(s) 190A2A that are performed by the butler visualized representation of the instance of the automated assistant in FIG. 7A, and as indicated by second gesture(s) and/or animation(s) 190A2B that are performed by the pirate visualized representation of the instance of the automated assistant in FIG. 7B). In these examples, the butler persona may correspond to a more formal and conservative persona, whereas the pirate persona may correspond to a more adventurous and edgy persona. These different personas are exemplified by the different vocabularies associated with the different personas, different sets of prosodic properties associated with the different personas, and/or different sets of visual cues associated with the different personas.

For example, in FIG. 7A where the butler persona is assigned to the instance of the automated assistant, the instance of the automated assistant can generate corresponding streams of textual content and corresponding streams of visual cues as corresponding given assistant outputs that are specific to the butler persona. In some implementations, the instance of the automated assistant may generate the corresponding given assistant outputs that are specific to the butler persona through utilization of various post-processing operations, and optionally thought utilization of one or more LLMs that are specific to the butler persona through utilization of one or more LLMs that are specific to the butler persona and/or that utilize butler persona data that is specific to the butler persona (e.g., as described with respect to the method 200 of FIG. 2). In additional or alternative implementations, the instance of the automated assistant may generate the corresponding given assistant outputs that are specific to the butler persona through utilization of one or more LLMs that are specific to the butler persona and/or that utilize butler persona data that is specific to the butler persona (e.g., as described with respect to the method 300 of FIG. 3).

For instance, the instance of the automated assistant can process, using ASR model(s), the corresponding streams of audio data capturing the spoken utterances 752, 756A to generate corresponding streams of ASR output, and can process, using NLU model(s), the corresponding streams of ASR output to generate corresponding streams of NLU output. The corresponding streams of audio data, the corresponding streams of ASR output, the corresponding streams of NLU output, and/or a context of the dialog session can be processed to generate corresponding given assistant outputs (or corresponding modified given assistant outputs). In determining the corresponding streams of textual content, corresponding outputs generating using an LLM or previously generated output generated using the LLM (e.g., previously generated based on spoken utterances that are the same or similar to those provided by the user) can include a corresponding probability distribution over a sequence of one or more words and/or phrases across one or more vocabularies, such as a butler persona vocabulary that is specific to the butler persona or a general vocabulary that may be biased towards words and/or phrases associated with the butler persona (e.g., "Salutations . . . " and "How are you keeping on this fine morning?" in the synthesized speech 754A, "sire" and "I do caution" in the synthesized speech 758A). Further, in generating the corresponding synthesized speech 754A and 758A based on the corresponding streams of textual content, a set of prosodic properties associated with the butler persona can utilized to ensure that a tone, rhythm, pitch, cadence, and/or other prosodic properties reflect that of the butler persona. Accordingly, the instance of the automated assistant can verbally reflect not only terminology that a real butler may utilize in terms of the corresponding streams of textual content, but also a speaking style that the real butler may utilize in terms of synthesizing the corresponding streams of textual content, thereby reflecting the formal and conservative personality of the butler persona.

Moreover, in determining the stream of visual cues, corresponding outputs generating using an LLM or previously generated output generated using the LLM (e.g., previously generated based on spoken utterances that are the same or similar to those provided by the user) can include a corresponding probability distribution over a sequence of tokens representing one or more animated physical motion gestures that may be performed by the visualized butler (e.g., as shown in the third portion 190C of the display 190 in FIG. 7A) and with respect to the corresponding streams of textual content and/or other animations to be performed with respect to the corresponding streams of textual content (e.g., instructions for controlling the display 190 as described above with respect to FIGS. 6A and 6B), such as the visualized butler nodding or lifting his monocle and/or waving when saying "Salutations", or holding and opening an umbrella when saying "I do caution to take your umbrella". These animated physical gesture motions and/or other animations can be synchronized with the corresponding streams of textual content in any manner described herein and/or other manners. Accordingly, the visualized butler for the instance of the automated assistant can visually reflect not only a real butler in terms of appearance at the display 190, but also animated physical gesture motions can be performed that match real physical gesture motions of a real butler in terms of the visualized butler being controlled based on the stream of visual cues, thereby further reflecting the formal and conservative personality of the butler persona.

Similarly, in FIG. 7B where the pirate persona is assigned to the instance of the automated assistant, the instance of the automated assistant can generate corresponding streams of textual content and corresponding streams of visual cues as corresponding given assistant outputs that are specific to the pirate persona. In some implementations, the instance of the automated assistant may generate the corresponding given assistant outputs that are specific to the pirate persona through utilization of various post-processing operations, and optionally thought utilization of one or more LLMs that are specific to the pirate persona through utilization of one or more LLMs that are specific to the pirate persona and/or that utilize pirate persona data that is specific to the pirate persona (e.g., as described with respect to the method 200 of FIG. 2). In additional or alternative implementations, the instance of the automated assistant may generate the corresponding given assistant outputs that are specific to the pirate persona through utilization of one or more LLMs that are specific to the pirate persona and/or that utilize pirate persona data that is specific to the pirate persona (e.g., as described with respect to the method 300 of FIG. 3).

For instance, the instance of the automated assistant can process, using ASR model(s), the corresponding streams of audio data capturing the spoken utterances 752, 756B to generate corresponding streams of ASR output, and can process, using NLU model(s), the corresponding streams of ASR output to generate corresponding streams of NLU output. The corresponding streams of audio data, the corresponding streams of ASR output, the corresponding streams of NLU output, and/or a context of the dialog session can be processed to generate corresponding given assistant outputs (or corresponding modified given assistant outputs). In determining the corresponding streams of textual content, corresponding outputs generating using an LLM or previously generated output generated using the LLM (e.g., previously generated based on spoken utterances that are the same or similar to those provided by the user) can include a corresponding probability distribution over a sequence of one or more words and/or phrases across one or more vocabularies, such as a pirate persona vocabulary that is specific to the pirate persona or a general vocabulary that may be biased towards words and/or phrases associated with the pirate persona (e.g., "Ahoy matey" and "Where are you setting sail today?" in the synthesized speech 754B, "treasure" in the synthesized speech 758B). Further, in generating the corresponding synthesized speech 754 and 758B based on the corresponding streams of textual content, a set of prosodic properties associated with the pirate persona can utilized to ensure that a tone, rhythm, pitch, cadence, and/or other prosodic properties reflect that of the pirate persona. Accordingly, the instance of the automated assistant can verbally reflect not only terminology that a real pirate may utilize in terms of the corresponding streams of textual content, but also a speaking style that the real pirate may utilize in terms of synthesizing the corresponding streams of textual content, thereby reflecting the adventurous and edgy personality of the pirate persona.

Moreover, in determining the stream of visual cues, corresponding outputs generating using an LLM or previously generated output generated using the LLM (e.g., previously generated based on spoken utterances that are the same or similar to those provided by the user) can a corresponding probability distribution over a sequence of animated physical gesture motions that may be performed by the visualized pirate (e.g., as shown in the third portion 190C of the display 190 in FIG. 7B) and with respect to the corresponding streams of textual content and/or other animations to be performed with respect to the corresponding streams of textual content (e.g., instructions for controlling the display 190 as described above with respect to FIGS. 6A and 6B), such as the visualized pirate jumping up and down and/or waving when saying "Ahoy matey", or digging for and opening a treasure chest when saying "perfect weather to find some treasure". These animated physical gesture motions and/or other animations can be synchronized with the corresponding streams of textual content in any manner described herein and/or other manners. Accordingly, the visualized pirate for the instance of the automated assistant can visually reflect not only a real pirate in terms of appearance at the display 190, but also animated physical gesture motions can be performed that match real physical gesture motions of a real pirate in terms of the visualized pirate being controlled based on the stream of visual cues, thereby further reflecting the adventurous and edgy personality of the pirate persona.

Although FIGS. 7A and 7B are described with respect to particular personas (e.g., the butler persona with respect to FIG. 7A and the pirate persona with respect to FIG. 7B) and with respect to particular visualized representations for the particular personas, it should be understood that is for the sake of example and is not meant to be limiting. Rather, it should be understood that the personas that can be assigned to the instance of the automated assistant may be virtually limitless. Further although the particular personas of FIGS. 7A and 7B are described with respect to particular streams of textual segments and particular streams of visual cues, it should be understood that is also for the sake of example and is not meant to be limiting. Rather, it should be understood that that the streams of textual segments can be generated based on a virtually limitless vocabulary through use of LLMs as described herein, and that the streams of visual cues can include persona-specific animated physical motion gestures and/or animations (e.g., the visualized butler lifting his monocle, the visualized pirate digging for treasure, etc.), persona-agnostic animated physical motion gestures and/or animations (e.g., the visualized butler smiling, the visualized pirate smiling, etc.), persona-specific emotions for different scenarios (e.g., the visualized butler being cautious of the rain and temperatures, the visualized pirate being excited for the rain and temperatures), corresponding visual cue timestamp(s) for controlling how the streams of visual cues are to be utilized with respect to the streams of textual content, etc. Moreover, although FIGS. 7A and 7B are described with respect to controlling the visualized representation of the instance of the automated assistant based on the streams of visual cues without controlling the display 190 (e.g., as described with respect to FIGS. 6A and 6B), it should be understood that is for the sake of brevity and is not meant to be limiting. Rather, it should be understood that these techniques can be combined. For instance, the visualized butler of FIG. 7A and the visualized pirate of FIG. 7B may appear as if they are located in the sunny beach scene shown in FIG. 6A that is adapted to the rainy beach scene shown in FIG. 6B. Furthermore, although FIGS. 7A and 7B are described with respect to the user providing spoken utterances as input, it should be understood that is for the sake of example and is not meant to be limiting. Rather, it should be understood that techniques of FIGS. 7A and 7B may also be employed in instances where the user provides typed input and/or a mix of typed input and spoken utterances.

Figure 8:
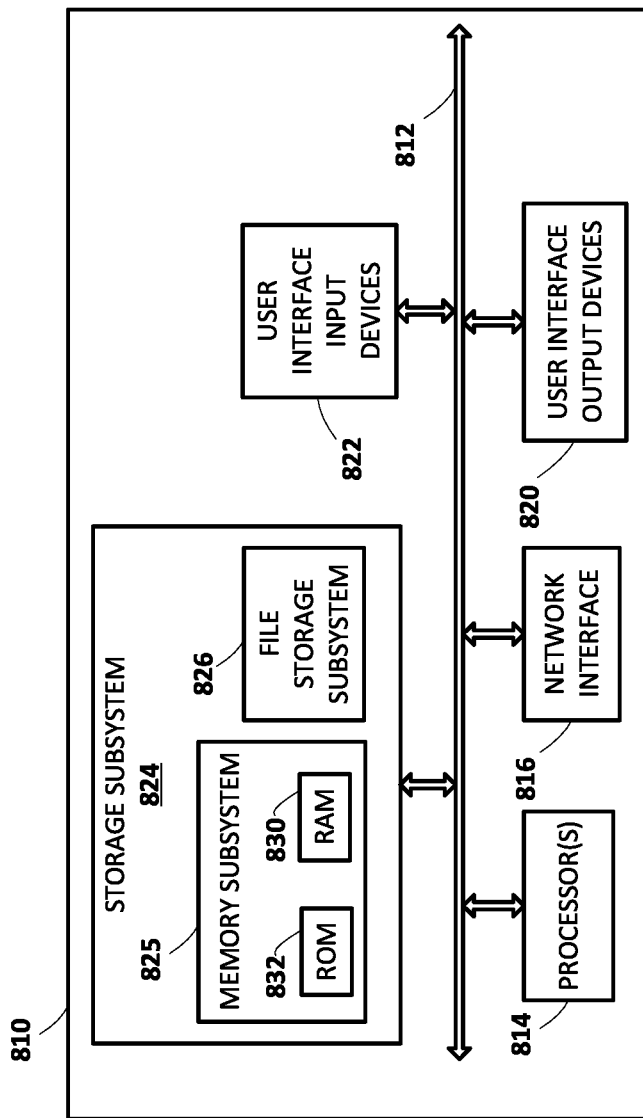
FIG. 8 depicts an example architecture of a computing device, in accordance with various implementations.

Turning now to FIG. 8, a block diagram of an example computing device 810 that may optionally be utilized to perform one or more aspects of techniques described herein is depicted. In some implementations, one or more of a client device, cloud-based automated assistant component(s), and/or other component(s) may comprise one or more components of the example computing device 810.

Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of the methods disclosed herein, as well as to implement various components depicted in FIG. 1.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem 812 may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, and includes receiving a stream of audio data that captures a spoken utterance of a user of a client device, the stream of audio data being generated by one or more microphones of the client device, and the spoken utterance being directed to an instance of an automated assistant executing at least in part at the client device; and generating, based on processing the stream of audio data, a given assistant output that is responsive to the spoken utterance. The given assistant output includes: (i) a stream of textual content; and (ii) a stream of visual cues for controlling a display of the client device responsive to the spoken utterance and/or for controlling a visualized representation of the instance of the automated assistant that is visually rendered for presentation to the user via the display of the client device. The method further includes modifying, based on a given assistant persona assigned to the instance of the automated assistant by the user and from among a plurality of disparate assistant personas, the given assistant output that is responsive to the spoken utterance to generate a modified given assistant output. The modified given assistant output includes: (i) a stream of modified textual content that differs from the stream of textual content; and (ii) a stream of modified visual cues for controlling the display of the client device responsive to the spoken utterance and/or for controlling the visualized representation of the instance of the automated assistant that differs from the stream of visual cues. The method further includes, in response to receiving the stream of audio data that captures the spoken utterance of the user of the client device: causing synthesized speech audio data capturing synthesized speech corresponding to the stream of modified textual context to be audibly rendered for presentation to the user via one or more speakers of the client device; and causing the stream of modified visual cues to be utilized in controlling the display of the client device and/or in controlling the visualized representation of the instance of the automated assistant.

These and other implementations of technology disclosed herein can optionally include one or more of the following features.

In some implementations, the method may further include synchronizing, for presentation to the user, the audible rendering of the synthesized speech corresponding to the stream of modified textual context and the utilization of the stream of modified visual cues in controlling the display of the client device and/or in controlling the visualized representation of the instance of the automated assistant.

In some versions of those implementations, the method may further include, prior to causing the synthesized speech audio data capturing the synthesized speech corresponding to the stream of modified textual context to be audibly rendered for presentation to the user: annotating the stream of modified textual context with one or more visual cue timestamps that indicate when the stream of visual cues is to be utilized in controlling the display of the client device and/or for controlling the visualized representation of the instance of the automated assistant. Synchronizing the audible rendering of the synthesized speech corresponding to the stream of modified textual context and the utilization of the stream of visual cues in controlling the display of the client device and/or for controlling the visualized representation of the instance of the automated assistant may be based on the one or more visual cue timestamps.

In some further versions of those implementations, the one or more visual cue timestamps may include at least a start visual cue timestamp that indicates when a given visual cue, included in the stream of visual cues, will start being utilized in controlling the display of the client device and/or for controlling the visualized representation of the instance of the automated assistant, and a stop visual cue timestamp that indicates when the given visual cue, included in the stream of visual cues, will stop being utilized in controlling the display of the client device and/or for controlling the visualized representation of the instance of the automated assistant.

In some implementations, generating the given assistant output that is responsive to the spoken utterance based on processing the stream of audio data may include processing, using an automatic speech recognition (ASR) model, the stream of audio data that captures the spoken utterance to generate a stream of ASR output; processing, using a natural language understanding (NLU) model, the stream of ASR output to generate a stream of NLU output; and determining, based on at least the stream of NLU output, the given assistant output that is responsive to the spoken utterance.

In some versions of those implementations, determining the given assistant output that is responsive to the spoken utterance based on the stream of NLU output may include processing, using a large language model (LLM), the stream of ASR output and/or the stream of NLU output to determine the stream of textual content and the stream of visual cues included in the given assistant output.

In additional or alternative versions of those implementations, determining the given assistant output that is responsive to the spoken utterance based on the stream of NLU output may include processing, using large language model (LLM) output that was previously generated using an LLM based on a previous instance of the spoken utterance, the stream of ASR output and/or the stream of NLU output to determine the stream of textual content and the stream of visual cues included in the given assistant output.

In additional or alternative versions of those implementations, determining the given assistant output that is responsive to the spoken utterance based on the stream of NLU output may include generating, based on the stream of ASR output and/or the stream of NLU output, one or more structured requests; transmitting, to one or more first-party agents and/or one or more third-party agents, the one or more structured requests; and determining, based on content received responsive to the one or more structured requests, the stream of textual content and the stream of visual cues included in the given assistant output.

In some implementations, modifying the given assistant output that is responsive to the spoken output to generate the modified given assistant output based on the given assistant persona assigned to the instance of the automated assistant may include obtaining, from one or more databases, given persona data that is specific to the given persona assigned to the instance of the automated assistant; and processing the stream of textual content and the stream of visual cues along with the persona data that is specific to the given persona assigned to the instance of the automated assistant to generate the stream of modified textual content that differs from the stream of textual content and the stream of modified visual cues that differs from the stream of visual cues.

In some versions of those implementations, the persona data that is specific to the given persona assigned to the instance of the automated assistant may include a given persona token that is specific to the given persona assigned to the instance of the automated assistant and/or a given embedding that is specific to the given persona assigned to the instance of the automated assistant.

In additional or alternative versions of those implementations, processing the stream of textual content and the stream of visual cues along with the persona data that is specific to the given persona assigned to the instance of the automated assistant to generate the stream of modified textual content that differs from the stream of textual content and the stream of modified visual cues that differs from the stream of visual cues may include processing, using a large language model (LLM), the stream of textual content and the stream of visual cues along with the persona data that is specific to the given persona assigned to the instance of the automated assistant to generate the stream of modified textual content that differs from the stream of textual content and the stream of modified visual cues that differs from the stream of visual cues.

In additional or alternative versions of those implementations, processing the stream of textual content and the stream of visual cues along with the persona data that is specific to the given persona assigned to the instance of the automated assistant to generate the stream of modified textual content that differs from the stream of textual content and the stream of modified visual cues that differs from the stream of visual cues may include processing, using large language model (LLM) output that was previously generated using a LLM based on a previous instance of the spoken utterance, the stream of textual content and the stream of visual cues along with the persona data that is specific to the given persona assigned to the instance of the automated assistant to generate the stream of modified textual content that differs from the stream of textual content and the stream of modified visual cues that differs from the stream of visual cues.

In some implementations, the given persona assigned to the instance of the automated assistant may be associated with: a first vocabulary, of a plurality of disparate vocabularies, utilized in modifying the stream of textual content to generate the stream of modified textual content, a first set of prosodic properties, of a plurality of disparate sets of prosodic properties, utilized in generating the synthesized speech audio data capturing the synthesized speech corresponding to the stream of modified textual context to be audibly rendered for presentation to the user, and/or a first set of visual cues, of a plurality of disparate sets of visual cues, utilized in modifying the stream of visual cues to generate the stream of modified visual cues.

In some versions of those implementations, the stream of modified textual content that differs from the stream of textual content may be modified using the first vocabulary, and the stream of modified visual cues for controlling the display of the client device responsive to the spoken utterance and/or for controlling the visualized representation of the instance of the automated assistant that differs from the stream of visual cues may be modified using the first set of visual cues.

In some further versions of those implementations, the method may further include processing, using a text-to-speech (TTS) model and based on the first set of the prosodic properties, the stream of modified textual content to generate the synthesized speech audio data.

In additional or alternative versions of those implementations, the method may further include receiving an additional stream of audio data that captures an additional spoken utterance of an additional user of an additional client device, the additional stream of audio data being generated by one or more additional microphones of the additional client device, the additional spoken utterance being directed to an additional instance of the automated assistant executing at least in part at the additional client device, and the additional spoken utterance being the same as the spoken utterance; and generating, based on processing the stream of additional audio data, the given assistant output that is responsive to the additional spoken utterance. The given assistant output may include: (i) the stream of textual content; and (ii) the stream of visual cues for controlling an additional display of the additional client device responsive to the additional spoken utterance and/or for controlling an additional visualized representation of the additional instance of the automated assistant that is visually rendered for presentation to the additional user via the additional display of the additional client device. The method may further include modifying, based on a given additional assistant persona assigned to the additional instance of the automated assistant that is in addition to the given assistant persona by the additional user and from among the plurality of disparate assistant personas, the given assistant output that is responsive to the additional spoken utterance to generate a modified given additional assistant output. The modified given additional assistant output may include: (i) a stream of modified additional textual content that differs from the stream of textual content and that differs from the stream of modified textual content; and (ii) a stream of modified additional visual cues for controlling the additional display of the additional client device responsive to the additional spoken utterance and/or for controlling the additional visualized representation of the additional instance of the automated assistant that differs from the stream of visual cues and that differs from the stream of modified visual cues. The method may further include, in response to receiving the additional stream of audio data that captures the additional spoken utterance of the additional user of the additional client device: causing additional synthesized speech audio data capturing additional synthesized speech corresponding to the stream of modified additional textual context to be audibly rendered for presentation to the additional user via one or more additional speakers of the additional client device; and causing the stream of modified additional visual cues to be utilized in controlling the additional display of the additional client device and/or in controlling the additional visualized representation of the additional instance of the automated assistant.

In some versions of those implementations, the given additional persona assigned to the additional instance of the automated assistant may be associated with: a second vocabulary, of the plurality of disparate vocabularies and that is in addition to the first vocabulary, utilized in modifying the stream of additional textual content to generate the stream of modified additional textual content, a second set of prosodic properties, of the plurality of disparate sets of prosodic properties and that is in addition to the first set of prosodic properties, utilized in generating the additional synthesized speech audio data capturing the additional synthesized speech corresponding to the stream of modified additional textual context to be audibly rendered for presentation to the additional user, and/or a second set of visual cues, of the plurality of disparate sets of visual cues and that is in addition to the first set of visual cues, utilized in modifying the stream of additional visual cues to generate the stream of modified additional visual cues.

In some implementations, the method may further include receiving an additional stream of audio data that captures an additional spoken utterance of an additional user of the client device, the additional stream of audio data being generated by the one or more microphones of the client device, the additional spoken utterance being directed to the instance of the automated assistant executing at least in part at the client device, and the additional spoken utterance being the same as the spoken utterance; generating, based on processing the stream of additional audio data, the given assistant output that is responsive to the additional spoken utterance. The given assistant output may include: (i) the stream of textual content; and (ii) the stream of visual cues for controlling the display of the client device responsive to the additional spoken utterance and/or for controlling an additional visualized representation of the instance of the automated assistant that is visually rendered for presentation to the additional user via the display of the client device. The method may further include modifying, based on a given additional assistant persona assigned to the additional instance of the automated assistant that is in addition to the given assistant persona by the additional user and from among the plurality of disparate assistant personas, the given assistant output that is responsive to the additional spoken utterance to generate a modified given additional assistant output. The modified given additional assistant output may include: (i) a stream of modified additional textual content that differs from the stream of textual content and that differs from the stream of modified textual content; and (ii) a stream of modified additional visual cues for controlling the display of the client device responsive to the additional spoken utterance and/or for controlling the additional visualized representation of the instance of the automated assistant that differs from the stream of visual cues and that differs from the stream of modified visual cues. The method may further include, in response to receiving the additional stream of audio data that captures the additional spoken utterance of the additional user of the client device: causing additional synthesized speech audio data capturing additional synthesized speech corresponding to the stream of modified additional textual context to be audibly rendered for presentation to the additional user via the one or more speakers of the client device; and causing the stream of modified additional visual cues to be utilized in controlling the display of the client device and/or in controlling the additional visualized representation of the instance of the automated assistant.

In some implementations, the user of the client device may assign the given persona to the instance of the automated assistant while initially configuring an automated assistant account for the instance of the automated assistant, or while interacting with assistant settings of an automated assistant application for the instance of the automated assistant.

In some implementations, the stream of modified visual cues may be utilized in controlling the display of the client device responsive to the spoken utterance.

In some versions of those implementations, the stream of modified visual cues may be further utilized in controlling the visualized representation of the instance of the automated assistant.

In additional or alternative versions of those implementations, the stream of modified visual cues that are utilized in controlling the display of the client device responsive to the spoken utterance may include one or more display animations that cause to the display of the client device to be dynamically adapted while the synthesized speech audio data is being audibly rendered for presentation to the user.

In some implementations, the stream of modified visual cues may be utilized in controlling the visualized representation of the instance of the automated assistant.

In some versions of those implementations, the stream of modified visual cues may be further utilized in controlling the display of the client device responsive to the spoken utterance.

In additional or alternative versions of those implementations, the stream of modified visual cues that are utilized in controlling the visualized representation of the instance of the automated assistant may include one or more animated physical gesture motions performed by the visualized representation of the instance of the automated assistant while the synthesized speech audio data is being audibly rendered for presentation to the user.

In some implementations, a method implemented by one or more processors is provided, and includes receiving a stream of audio data that captures a spoken utterance of a user of a client device, the stream of audio data being generated by one or more microphones of the client device, and the spoken utterance being directed to an instance of an automated assistant executing at least in part at the client device; and generating, based on processing the stream of audio data and using a given large language model (LLM), a given assistant output that is responsive to the spoken utterance and that is specific to a given persona assigned to the instance of the automated assistant from among a plurality of disparate personas. The given assistant output includes: (i) a stream of textual content that is specific to the given persona of the instance of the automated assistant; and (ii) a stream of visual cues for controlling a display of the client device responsive to the spoken utterance and/or for controlling a visualized representation of the instance of the automated assistant that is visually rendered for presentation to the user via the display of the client device and that is specific to the given persona assigned to the instance of the automated assistant. The method further includes, in response to receiving the stream of audio data that captures the spoken utterance of the user of the client device: causing synthesized speech audio data capturing synthesized speech corresponding to the stream of textual context to be audibly rendered for presentation to the user via one or more speakers of the client device; and causing the stream of visual cues to be utilized in controlling the display of the client device and/or in controlling the visualized representation of the instance of the automated assistant.

These and other implementations of technology disclosed herein can optionally include one or more of the following features.

In some implementations, the method may further include identifying the given persona, from among a plurality of disparate personas, assigned to the instance of the automated assistant by the user; and selecting the given LLM, from among a plurality of disparate LLMs, that is associated with the given persona assigned to the automated assistant by the user.

In some implementations, the method may further include identifying the given persona, from among a plurality of disparate personas, assigned to the instance of the automated assistant by the user; and selecting given persona data that is specific to the given persona assigned to the instance of the automated assistant. The given persona data may be processed using the given LLM in generating the given assistant output.

In some versions of those implementations, the persona data that is specific to the given persona assigned to the instance of the automated assistant may include a given persona token that is specific to the given persona assigned to the instance of the automated assistant and/or a given embedding that is specific to the given persona assigned to the instance of the automated assistant.

In some implementations, a method implemented by one or more processors is provided, and includes receiving a stream of audio data that captures a spoken utterance of a user of a client device, the stream of audio data being generated by one or more microphones of the client device, and the spoken utterance being directed to an instance of an automated assistant executing at least in part at the client device; and generating, based on processing the stream of audio data, a given assistant output that is responsive to the spoken utterance. The given assistant output includes: (i) a stream of textual content; and (ii) a stream of visual cues for controlling a display of the client device responsive to the spoken utterance and/or for controlling a visualized representation of the instance of the automated assistant that is visually rendered for presentation to the user via the display of the client device. The method further includes modifying, based on a given assistant persona assigned to the instance of the automated assistant by the user and from among a plurality of disparate assistant personas, the given assistant output that is responsive to the spoken utterance to generate a modified given assistant output. The modified given assistant output includes: (i) the stream of textual content; and (ii) a stream of modified visual cues for controlling the display of the client device responsive to the spoken utterance and/or for controlling the visualized representation of the instance of the automated assistant that differs from the stream of visual cues. The method further includes, in response to receiving the stream of audio data that captures the spoken utterance of the user of the client device: causing synthesized speech audio data capturing synthesized speech corresponding to the stream of textual context to be audibly rendered for presentation to the user via one or more speakers of the client device; and causing the stream of modified visual cues to be utilized in controlling the display of the client device and/or in controlling the visualized representation of the instance of the automated assistant.

In some implementations, a method implemented by one or more processors is provided, and includes receiving, from a developer associated with an automated assistant and for a given persona that is assignable to the automated assistant, developer input associated with one or more visual cues to be utilized in controlling a display of a client device with respect to a stream of textual content and/or in controlling a visualized representation of an instance of the automated assistant with respect to the stream of textual content; generating, based on at least the developer input, a given persona training instance to be utilized in further training an instance of a given large language model (LLM) that is specific to the given persona from among a plurality of disparate personas, the given LLM being previously trained to generate the stream of textual content; training the instance of the given LLM based on at least the given persona training instance; and causing the instance of the given LLM to be utilized in subsequently processing audio data capturing spoken utterances directed to the instance of the automated assistant that is assigned the given persona.

These and other implementations of technology disclosed herein can optionally include one or more of the following features.

In some implementations, the method may further include receiving, from the developer associated with the automated assistant and for a given additional persona that is assignable to the automated assistant, additional developer input associated with one or more additional visual cues to be utilized in controlling the display of the client device with respect to a stream of additional textual content and/or in controlling an additional visualized representation of an additional instance of the automated assistant with respect to the stream of additional textual content; generating, based on at least the additional developer input, a given additional persona training instance to be utilized in further training to be utilized in training an additional instance of the given LLM that is specific to the given additional persona from among the plurality of disparate personas; training the additional instance of the given additional LLM based on at least the given additional persona training instance; and causing the additional instance of the given additional LLM to be utilized in subsequently processing additional audio data capturing additional spoken utterances directed to the additional instance of the automated assistant that is assigned the given additional persona.

In some implementations, the developer input may annotate the stream of textual content with one or more visual cue timestamps that indicate when the stream of visual cues is to be utilized in controlling the display of the client device with respect to the stream of textual content and/or in controlling the visualized representation of the instance of the automated assistant with respect to the stream of textual content.

In some versions of those implementations, the one or more visual cue timestamps may include at least a start visual cue timestamp that indicates when a given visual cue, included in the stream of visual cues, will start being utilized in controlling the display of the client device with respect to the stream of textual content and/or in controlling the visualized representation of the instance of the automated assistant with respect to the stream of textual context, and a stop visual cue timestamp that indicates when the given visual cue, included in the stream of visual cues, will stop being utilized in controlling the display of the client device with respect to the stream of textual context and/or in controlling the visualized representation of the instance of the automated assistant with respect to the stream of textual context.

In some implementations, the developer input may modify a screen animation at the display of the client device with respect to the stream of textual content and/or may cause the visualized representation of the instance of the automated assistant to perform one or more animated physical gesture motions with respect to the stream of textual content.

In some implementations, a method implemented by one or more processors is provided, and includes obtaining, from an online multimedia repository, video content that includes a stream of audio data for audible content of the video and a stream of vision data for visual content of the video; processing, using an automatic speech recognition model, the stream of audio data for the audible content of the video to generate a stream of textual content corresponding to one or more spoken utterances captured in the stream of audio data for the audible content of the video; processing, using one or more movement tracking machine learning models, the stream of vision data for the visual content of the video to generate the stream of visual cues; generating, based on processing the stream of audio data and based on processing the stream of video data, a given persona training data instance to be utilized in further training an instance of a given large language model (LLM) that is specific to a given persona, from among of a plurality of disparate personas, embodied in the video content; training the instance of the given LLM based on at least the given persona training instance; and causing the instance of the given LLM to be utilized in subsequently processing additional audio data capturing additional spoken utterances directed to an instance of an automated assistant that is assigned the given persona.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

What is claimed is:

1. A method implemented by one or more processors, the method comprising:

receiving a stream of audio data that captures a spoken utterance of a user of a client device, the stream of audio data being generated by one or more microphones of the client device, and the spoken utterance being directed to an instance of an automated assistant executing at least in part at the client device;

generating, based on processing the stream of audio data, a given assistant output that is responsive to the spoken utterance, wherein the given assistant output includes: (i) a stream of textual content; and (ii) a stream of visual cues for controlling a display of the client device responsive to the spoken utterance and/or for controlling a visualized representation of the instance of the automated assistant that is visually rendered for presentation to the user via the display of the client device; and modifying, based on a given assistant persona assigned to the instance of the automated assistant by the user and from among a plurality of disparate assistant personas, the given assistant output that is responsive to the spoken utterance to generate a modified given assistant output, wherein the modified given assistant output includes: (i) a stream of modified textual content that differs from the stream of textual content; and (ii) a stream of modified visual cues for controlling the display of the client device responsive to the spoken utterance and/or for controlling the visualized representation of the instance of the automated assistant that differs from the stream of visual cues;

annotating the stream of modified textual content with one or more visual cue timestamps that indicate when the stream of modified visual cues is to be utilized in controlling the display of the client device and/or for controlling the visualized representation of the instance of the automated assistant;

synchronizing, for presentation to the user, and based on the one or more visual cue timestamps, audible rendering of synthesized speech corresponding to the stream of modified textual content and the utilization of the stream of modified visual cues in controlling the display of the client device and/or in controlling the visualized representation of the instance of the automated assistant; and in response to receiving the stream of audio data that captures the spoken utterance of the user of the client device:
causing synthesized speech audio data capturing the synthesized speech corresponding to the stream of modified textual content to be audibly rendered for presentation to the user via one or more speakers of the client device; and
causing the stream of modified visual cues to be utilized in controlling the display of the client device and/or in controlling the visualized representation of the instance of the automated assistant.

2. The method of claim 1, wherein generating the given assistant output that is responsive to the spoken utterance based on processing the stream of audio data comprises:
processing, using an automatic speech recognition (ASR) model, the stream of audio data that captures the spoken utterance to generate a stream of ASR output;
processing, using a natural language understanding (NLU) model, the stream of ASR output to generate a stream of NLU output; and
determining, based on at least the stream of NLU output, the given assistant output that is responsive to the spoken utterance.

3. The method of claim 2, wherein determining the given assistant output that is responsive to the spoken utterance based on the stream of NLU output comprises:
processing, using a large language model (LLM), the stream of ASR output and/or the stream of NLU output to determine the stream of textual content and the stream of visual cues included in the given assistant output.

4. The method of claim 2, wherein determining the given assistant output that is responsive to the spoken utterance based on the stream of NLU output comprises:
processing, using large language model (LLM) output that was previously generated using an LLM based on a previous instance of the spoken utterance, the stream of ASR output and/or the stream of NLU output to determine the stream of textual content and the stream of visual cues included in the given assistant output.

5. The method of claim 2, wherein determining the given assistant output that is responsive to the spoken utterance based on the stream of NLU output comprises:
generating, based on the stream of ASR output and/or the stream of NLU output, one or more structured requests;
transmitting, to one or more first-party agents and/or one or more third-party agents, the one or more structured requests; and
determining, based on content received responsive to the one or more structured requests, the stream of textual content and the stream of visual cues included in the given assistant output.

6. The method of claim 1, wherein modifying the given assistant output that is responsive to the spoken output to generate the modified given assistant output based on the given assistant persona assigned to the instance of the automated assistant comprises:
obtaining, from one or more databases, given persona data that is specific to the given persona assigned to the instance of the automated assistant; and
processing the stream of textual content and the stream of visual cues along with the persona data that is specific to the given persona assigned to the instance of the automated assistant to generate the stream of modified textual content that differs from the stream of textual content and the stream of modified visual cues that differs from the stream of visual cues.

7. The method of claim 6, wherein the persona data that is specific to the given persona assigned to the instance of the automated assistant includes a given persona token that is specific to the given persona assigned to the instance of the automated assistant and/or a given embedding that is specific to the given persona assigned to the instance of the automated assistant.

8. The method of claim 6, wherein processing the stream of textual content and the stream of visual cues along with the persona data that is specific to the given persona assigned to the instance of the automated assistant to generate the stream of modified textual content that differs from the stream of textual content and the stream of modified visual cues that differs from the stream of visual cues comprises:
processing, using a large language model (LLM), the stream of textual content and the stream of visual cues along with the persona data that is specific to the given persona assigned to the instance of the automated assistant to generate the stream of modified textual content that differs from the stream of textual content and the stream of modified visual cues that differs from the stream of visual cues.

9. The method of claim 6, wherein processing the stream of textual content and the stream of visual cues along with the persona data that is specific to the given persona assigned to the instance of the automated assistant to generate the stream of modified textual content that differs from the stream of textual content and the stream of modified visual cues that differs from the stream of visual cues comprises:
processing, using large language model (LLM) output that was previously generated using a LLM based on a previous instance of the spoken utterance, the stream of textual content and the stream of visual cues along with the persona data that is specific to the given persona assigned to the instance of the automated assistant to generate the stream of modified textual content that differs from the stream of textual content and the stream of modified visual cues that differs from the stream of visual cues.

10. The method of claim 1, wherein the given persona assigned to the instance of the automated assistant is associated with:
a first vocabulary, of a plurality of disparate vocabularies, utilized in modifying the stream of textual content to generate the stream of modified textual content,
a first set of prosodic properties, of a plurality of disparate sets of prosodic properties, utilized in generating the synthesized speech audio data capturing the synthesized speech corresponding to the stream of modified textual content to be audibly rendered for presentation to the user, and/or
a first set of visual cues, of a plurality of disparate sets of visual cues, utilized in modifying the stream of visual cues to generate the stream of modified visual cues.

11. The method of claim 10, wherein the stream of modified textual content that differs from the stream of textual content is modified using the first vocabulary, and wherein the stream of modified visual cues for controlling the display of the client device responsive to the spoken utterance and/or for controlling the visualized representation of the instance of the automated assistant that differs from the stream of visual cues is modified using the first set of visual cues.

12. The method of claim 11, further comprising:
processing, using a text-to-speech (TTS) model and based on the first set of the prosodic properties, the stream of modified textual content to generate the synthesized speech audio data.

13. The method of claim 10, further comprising:
receiving an additional stream of audio data that captures an additional spoken utterance of an additional user of an additional client device, the additional stream of audio data being generated by one or more additional microphones of the additional client device, the additional spoken utterance being directed to an additional instance of the automated assistant executing at least in part at the additional client device, and the additional spoken utterance being the same as the spoken utterance;
generating, based on processing the stream of additional audio data, the given assistant output that is responsive to the additional spoken utterance, wherein the given assistant output includes: (i) the stream of textual content; and (ii) the stream of visual cues for controlling an additional display of the additional client device responsive to the additional spoken utterance and/or for controlling an additional visualized representation of the additional instance of the automated assistant that is visually rendered for presentation to the additional user via the additional display of the additional client device; and
modifying, based on a given additional assistant persona assigned to the additional instance of the automated assistant that is in addition to the given assistant persona by the additional user and from among the plurality of disparate assistant personas, the given assistant output that is responsive to the additional spoken utterance to generate a modified given additional assistant output, wherein the modified given additional assistant output includes: (i) a stream of modified additional textual content that differs from the stream of textual content and that differs from the stream of modified textual content; and (ii) a stream of modified additional visual cues for controlling the additional display of the additional client device responsive to the additional spoken utterance and/or for controlling the additional visualized representation of the additional instance of the automated assistant that differs from the stream of visual cues and that differs from the stream of modified visual cues; and
in response to receiving the additional stream of audio data that captures the additional spoken utterance of the additional user of the additional client device:
causing additional synthesized speech audio data capturing additional synthesized speech corresponding to the stream of modified additional textual content to be audibly rendered for presentation to the additional user via one or more additional speakers of the additional client device; and
causing the stream of modified additional visual cues to be utilized in controlling the additional display of the additional client device and/or in controlling the additional visualized representation of the additional instance of the automated assistant.

14. The method of claim 1, wherein the stream of modified visual cues is utilized in controlling the display of the client device responsive to the spoken utterance, and wherein the stream of modified visual cues that are utilized in controlling the display of the client device responsive to the spoken utterance include one or more display animations that cause the display of the client device to be dynamically adapted while the synthesized speech audio data is being audibly rendered for presentation to the user.

15. The method of claim 1, wherein the stream of modified visual cues is utilized in controlling the visualized representation of the instance of the automated assistant, and wherein the stream of modified visual cues that are utilized in controlling the visualized representation of the instance of the automated assistant include one or more animated physical gesture motions performed by the visualized representation of the instance of the automated assistant while the synthesized speech audio data is being audibly rendered for presentation to the user.

16. The method of claim 1, wherein the one or more visual cue timestamps include at least a start visual cue timestamp that indicates when a given visual cue, included in the stream of modified visual cues, will start being utilized in controlling the display of the client device and/or for controlling the visualized representation of the instance of the automated assistant, and a stop visual cue timestamp that indicates when the given visual cue, included in the stream of modified visual cues, will stop being utilized in controlling the display of the client device and/or for controlling the visualized representation of the instance of the automated assistant.

17. A method implemented by one or more processors, the method comprising:
receiving a stream of audio data that captures a spoken utterance of a user of a client device, the stream of audio data being generated by one or more microphones of the client device, and the spoken utterance being directed to an instance of an automated assistant executing at least in part at the client device;
generating, based on processing the stream of audio data and using a given large language model (LLM), a given assistant output that is responsive to the spoken utterance and that is specific to a given persona assigned to the instance of the automated assistant from among a plurality of disparate personas, wherein the given assistant output includes: (i) a stream of textual content that is specific to the given persona of the instance of the automated assistant; and (ii) a stream of visual cues for controlling a display of the client device responsive to the spoken utterance and/or for controlling a visualized representation of the instance of the automated assistant that is visually rendered for presentation to the user via the display of the client device and that is specific to the given persona assigned to the instance of the automated assistant;

annotating the stream of textual content with one or more visual cue timestamps that indicate when the stream of visual cues is to be utilized in controlling the display of the client device and/or for controlling the visualized representation of the instance of the automated assistant;

synchronizing, for presentation to the user, and based on the one or more visual cue timestamps, audible rendering of synthesized speech corresponding to the stream of textual content and the utilization of the stream of visual cues in controlling the display of the client device and/or in controlling the visualized representation of the instance of the automated assistant; and in response to receiving the stream of audio data that captures the spoken utterance of the user of the client device:
    causing synthesized speech audio data capturing the synthesized speech corresponding to the stream of textual content to be audibly rendered for presentation to the user via one or more speakers of the client device; and
    causing the stream of visual cues to be utilized in controlling the display of the client device and/or in controlling the visualized representation of the instance of the automated assistant.

18. A system comprising:

at least one processor; and memory storing instructions that, when executed, cause the at least one processor to be operable to:
    receive a stream of audio data that captures a spoken utterance of a user of a client device, the stream of audio data being generated by one or more microphones of the client device, and the spoken utterance being directed to an instance of an automated assistant executing at least in part at the client device;

generate, based on processing the stream of audio data and using a given large language model (LLM), a given assistant output that is responsive to the spoken utterance and that is specific to a given persona assigned to the instance of the automated assistant from among a plurality of disparate personas, wherein the given assistant output includes: (i) a stream of textual content that is specific to the given persona of the instance of the automated assistant; and (ii) a stream of visual cues for controlling a display of the client device responsive to the spoken utterance and/or for controlling a visualized representation of the instance of the automated assistant that is visually rendered for presentation to the user via the display of the client device and that is specific to the given persona assigned to the instance of the automated assistant;

annotate the stream of textual content with one or more visual cue timestamps that indicate when the stream of visual cues is to be utilized in controlling the display of the client device and/or for controlling the visualized representation of the instance of the automated assistant;

synchronize, for presentation to the user, and based on the one or more visual cue timestamps, audible rendering of synthesized speech corresponding to the stream of textual content and the utilization of the stream of visual cues in controlling the display of the client device and/or in controlling the visualized representation of the instance of the automated assistant; and in response to receiving the stream of audio data that captures the spoken utterance of the user of the client device:
        cause synthesized speech audio data capturing the synthesized speech corresponding to the stream of textual content to be audibly rendered for presentation to the user via one or more speakers of the client device; and
        cause the stream of visual cues to be utilized in controlling the display of the client device and/or in controlling the visualized representation of the instance of the automated assistant.

\* \* \* \* \*